United States Patent
Kawana

(10) Patent No.: US 7,965,449 B2
(45) Date of Patent: Jun. 21, 2011

(54) PROJECTION LENS SYSTEM AND PROJECTION TYPE DISPLAY APPARATUS USING THE SAME

(75) Inventor: Masanao Kawana, Saitama (JP)

(73) Assignee: Fujinon Corporation, Saitama (JP)

( * ) Notice: Subject to any disclaimer, the term of this patent is extended or adjusted under 35 U.S.C. 154(b) by 63 days.

(21) Appl. No.: 12/621,948

(22) Filed: Nov. 19, 2009

(65) Prior Publication Data

US 2010/0123955 A1 May 20, 2010

(30) Foreign Application Priority Data

Nov. 20, 2008 (JP) ................ P2008-296790

(51) Int. Cl.
*G02B 9/00* (2006.01)
*G02B 13/22* (2006.01)
*G03B 21/00* (2006.01)

(52) U.S. Cl. ............ 359/651; 359/663; 353/33
(58) Field of Classification Search ............ 353/33, 353/34; 359/649, 650, 651, 663, 680, 681, 359/682

See application file for complete search history.

(56) References Cited

U.S. PATENT DOCUMENTS

| | | | | |
|---|---|---|---|---|
| 7,280,285 B2 * | 10/2007 | Nagahara et al. | ............ | 359/680 |
| 7,289,270 B2 * | 10/2007 | Yamamoto | ............ | 359/649 |
| 7,355,799 B2 * | 4/2008 | Yamamoto | ............ | 359/649 |
| 7,436,597 B2 * | 10/2008 | Nagatoshi | ............ | 359/649 |
| 7,529,033 B2 * | 5/2009 | Yamamoto | ............ | 359/649 |
| 2003/0137744 A1 | 7/2003 | Kuwa et al. | | |
| 2004/0257666 A1 | 12/2004 | Komatsu et al. | | |

FOREIGN PATENT DOCUMENTS

| | | | |
|---|---|---|---|
| JP | 2003-15033 A | | 1/2003 |
| JP | 2004-326079 A | | 11/2004 |
| JP | 2008-309988 A | | 12/2008 |

* cited by examiner

*Primary Examiner* — David N Spector
(74) *Attorney, Agent, or Firm* — Birch, Stewart, Kolasch & Birch, LLP

(57) ABSTRACT

A projection lens system includes, in order from the magnification side, a negative first lens group and a positive second lens group, and is telecentric on the reduction side. The first lens group includes a first lens formed as an aspheric lens which is disposed closest to the magnification side. The second lens group includes a second lens formed as a positive lens, in or near which an aperture diaphragm is disposed, disposed closest to the magnification side, and an aspheric lens. Between the aperture diaphragm and the aspheric lens of the second lens group, two or more negative lenses and two or more cemented surfaces are disposed. And, $0.10 < f/f_{2-1} < 0.30$, and $N_{2-1} > 1.75$ are satisfied. Here, f denotes a focal length of the whole system, $f_{2-1}$ denotes a focal length of the second lens, and $N_{2-1}$ is a refractive index of the second lens at the d-line.

14 Claims, 13 Drawing Sheets

EXAMPLE 1

FIG.5 EXAMPLE 5

EXAMPLE 1

EXAMPLE 2

EXAMPLE 3

EXAMPLE 4

EXAMPLE 5

EXAMPLE 6

PROJECTION LENS SYSTEM AND PROJECTION TYPE DISPLAY APPARATUS USING THE SAME

CROSS-REFERENCE TO RELATED APPLICATIONS

This application is based on and claims priority under 35 USC 119 from Japanese Patent Application No. 2008-296790 filed on Nov. 20, 2008; the entire of which are incorporated herein by reference.

BACKGROUND

1. Technical Field

The present invention relates to a projection lens system for projecting display information and the like from a light valve such as a liquid crystal display device in an enlarged manner. Particularly, the invention relates to a projection lens system suitable for the front projection type display apparatus and a projection type display apparatus using the same.

2. Related Art

Recently, projection type display apparatuses which use light valves such as a liquid crystal display device and a DMD display device have become widespread. In particular, one such widely used apparatus is a projection type display apparatus having a configuration in which three light valves corresponding to illuminating rays of RGB three primary colors are employed, the rays modulated by the respective light valves are synthesized by a prism or the like, and an image is displayed on a screen through a projection lens.

In the projection lens system provided in the projection type display apparatus that synthesizes the rays, which are modulated by the three light valves, through a color synthesizing optical system and projects the rays, a long back focal length is required in order to dispose a prism for synthesizing the colors as described above and the like, and in order to avoid a thermal problem. Furthermore, in the color synthesizing optical system, a spectral characteristic varies with the angle of incident light. Hence, it is required for the projection lens system to have a characteristic in which an entrance pupil is sufficiently far away in view from the reduction side, that is, telecentricity. Further, it is also required for the system to be a fast lens and to correct aberrations in accordance with resolutions of the light valves.

The projection lens systems satisfying some of the above-mentioned requirements include, for example, the lens systems disclosed in the following Patent Document 1 (JP-A-2003-015033 corresponding to US-A-2003/0137744) and Patent Document 2 (JP-A-2004-326079 corresponding to US-A-2004/0257666). Further, applicants of the invention also filed patent applications relating to such projection lens systems (see the following Patent Document 3 (JP-A-2008-309988)).

All the projection lens systems disclosed in these Patent Documents are formed as wide-angle lens systems of which each angle of view is 100 degrees or more.

By the way, as the projection type display apparatuses, a front type apparatus and a rear type apparatus has been developed. In the front type apparatus, the projection lens system is disposed on the same side as an observer relative to a screen and light emitted from the projection lens system forms an image on the reflective type screen. In the rear type apparatus, the projection lens system and the observer are disposed with the screen interposed therebetween and light emitted from the projection lens system forms an image on the transmissive type screen.

As an example of the rear projection type display apparatus, a rear projection television includes components from the light source to the screen to be incorporated in a cabinet and light containing image information from the projection lens system disposed on the rear side of the cabinet is projected toward the screen disposed on the front side of the cabinet. In Patent Documents 1 to 3, it is also assumed that the projection lens system is provided in such a rear projection type display apparatus.

However, in the projection lens system of the rear type apparatus, a prism or a mirror for deflecting the optical axis is disposed in order to decrease a thickness of the cabinet, and the entire length of the lens system is elongated along the optical axis. Hence, the spatial size of the apparatus increases in the end. Accordingly, when the projection lens system described in the patent publications is used in the front projection type display apparatus, a problem arises in that the apparatus can not be downsized.

Further, in the front projection type display system (including the display apparatus and the screen), the area of a space for installing the system is often restricted as compared with the rear type. From this viewpoint, the working distance from the display apparatus to the screen is required to be decreased, and the angle of view of the projection lens system is required to be increased.

SUMMARY

The invention has been made in view of the above situation, and its object is to provide a high-performance projection lens system, which is configured to be telecentric on the reduction side and have a back focal length appropriate for the recent projection lens system and is capable of achieving compactness in the whole lens system and an increase in the angle of view thereof so as to be applicable even to the projection lens system of the front projection type display apparatus, and a projection type display apparatus using the projection lens system.

A projection lens system according to an aspect of the invention is configured as follows.

The projection lens system includes, in order from the magnification side: a first lens group having a negative refractive power; and a second lens group having a positive refractive power. The projection lens system is substantially telecentric on a reduction side.

The first lens group includes a first lens formed as an aspheric lens which is disposed closest to the magnification side.

The second lens group includes a second lens formed as a positive lens, in or near which an aperture diaphragm is provided, disposed closest to the magnification side and an aspheric lens.

Between the aperture diaphragm and the aspheric lens of the second lens group, two or more negative lenses and two or more cemented surfaces are disposed.

The projection zoom lens system satisfies the following conditional expressions (1) and (2):

$$0.10 < f/f_{2\text{-}1} < 0.30 \quad (1), \text{ and}$$

$$N_{2\text{-}1} > 1.75 \quad (2).$$

where f denotes a focal length of the whole lens system,
$f_{2\text{-}1}$ denotes a focal length of the second lens, and
$N_{2\text{-}1}$ denotes a refractive index of the second lens at the d-line.

Further, it is preferable that each lens other than the second lens and the aspheric lens in the lenses of the second lens group satisfy any one of the following conditional expressions (3) and (4):

$$N_{2p} < 1.55 \quad (3), \text{ and}$$

$$N_{2n} > 1.73 \quad (4),$$

where $N_{2p}$ denotes a refractive index of a positive lens of said each lens in the second lens group at the d-line, and $N_{2n}$ denotes a refractive index of a negative lens of said each lens in the second lens group at the d-line.

Furthermore, it is preferable that the second lens group include two or more positive lenses of which Abbe numbers ($v_d$) are 75 or more.

It is preferable that the first lens group include, in order from the magnification side, an aspheric lens made of plastic, two negative meniscus lenses each having a convex surface directed toward the magnification side, and a cemented lens formed of a negative lens having a concave surface directed toward the magnification side and a positive lens having a convex surface directed toward the reduction side.

Further, it is preferable that focusing be performed by moving the cemented lens of the first lens group in a direction of an optical axis.

Furthermore, it is preferable that the cemented lens of the first lens group satisfy the following conditional expression (5):

$$|N_{1p} - N_{1n}| < 0.1 \quad (5),$$

where $N_{1p}$ denotes a refractive index of the positive lens constituting the cemented lens in the first lens group at the d-line, and $N_{1n}$ denotes a refractive index of the negative lens constituting the cemented lens in the first lens group at the d-line.

Further, it is preferable that the second lens group include, in order from the magnification side, a positive lens, a cemented lens formed of a negative meniscus lens having a convex surface directed toward the magnification side and a biconvex lens, a cemented lens formed of a biconcave lens and a biconvex lens, an aspheric lens, a cemented lens formed of a biconcave lens and a biconvex lens, and a biconvex lens.

Furthermore, a projection type display apparatus according to another aspect of the invention includes: a light source; a light valve; an illumination optical unit guiding rays originated from the light source into the light valve; and the projection lens system according to the aspect of the invention. In the apparatus, the rays originated from the light source are optically modulated by the light valve, and are projected on a screen by the projection lens system.

With such a configuration, the projection lens system according to the aspect of the invention can be embodied as a high-resolution projection lens system having a back focal length appropriate for the recent projection lens system while being capable of achieving compactness in the whole lens system and an increase in the angle of view thereof so as to be applicable even to the projection lens system of the front projection type display apparatus.

In particular, both of the conditional expressions (1) and (2) are satisfied. With such a configuration, it is possible to achieve compactness of the lens system and it is also possible to satisfactorily correct various aberrations including spherical aberration and field curvature.

Further, the projection type display apparatus according to the aspect of the invention uses the projection lens system according to the aspect of the invention. With such a configuration, it is possible to achieve compactness for the sake of applying the projection lens system even to the front projection type display apparatus.

DETAILED DESCRIPTION

Figure 1:
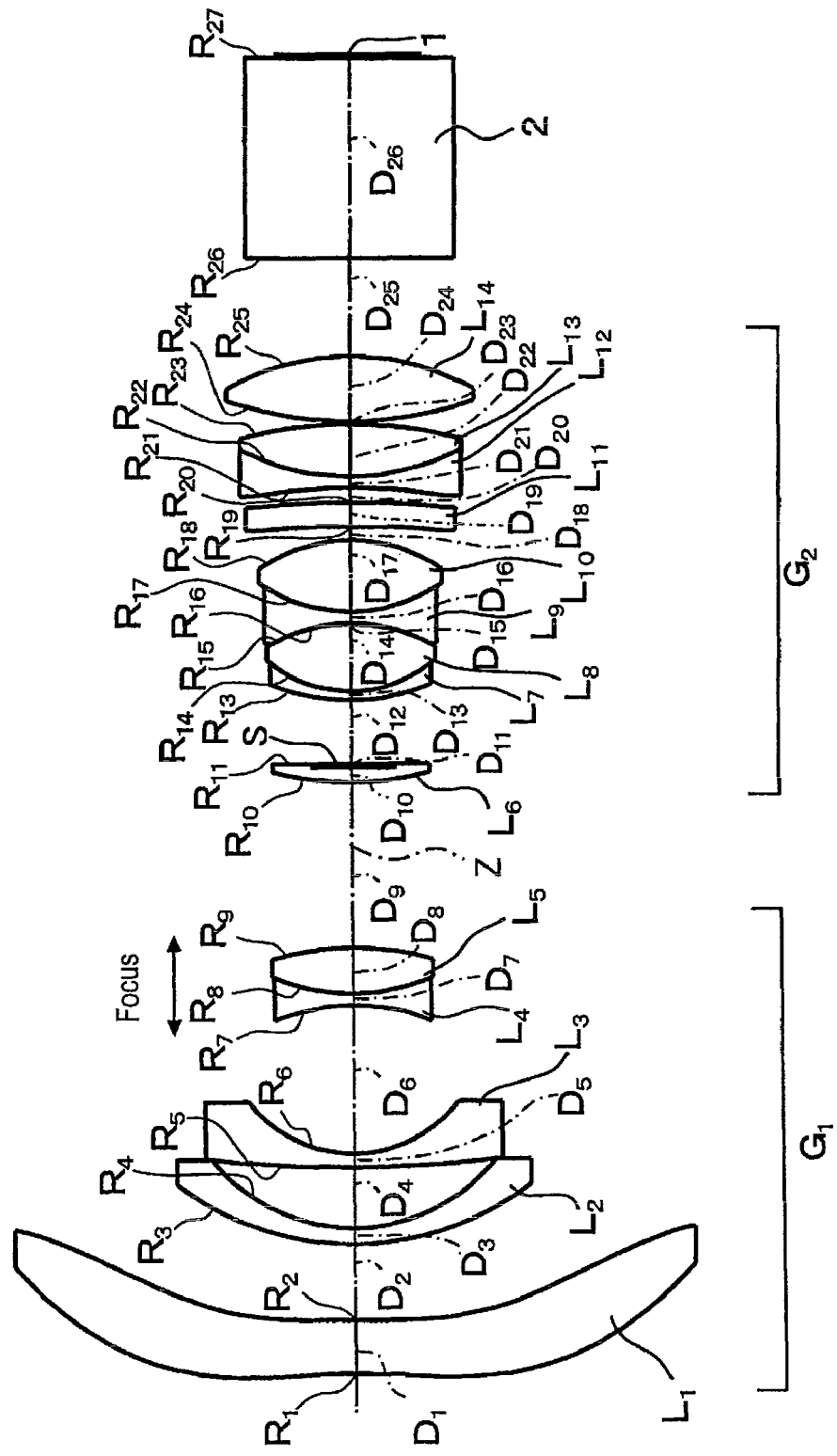
FIG. 1 is a diagram illustrating a configuration of a projection lens system according to Example 1 of the invention.

Hereinafter, an embodiment of the invention will be described in detail with reference to the drawings. FIG. 1 shows a projection lens system according to the embodiment, and is a diagram of a lens configuration of Example 1 to be described later. The above-mentioned lens will be described below as a representative example of the embodiment. Furthermore, the reference sign Z in the drawing represents an optical axis.

The projection lens system according to the embodiment includes, in order from the magnification side, a first lens group $G_1$ having a negative refractive power and a second lens group $G_2$ having a positive refractive power, and is telecentric on the reduction side.

The first lens group $G_1$ includes a first lens (a first lens $L_1$) formed as an aspheric lens which is disposed closest to the magnification side.

The second lens group $G_2$ includes a second lens (a sixth lens $L_6$ in the following examples) formed as a positive lens which is disposed closest to the magnification side, and an aperture diaphragm S disposed in or near the positive lens. In addition, the second lens group $G_2$ includes an aspheric lens.

Between the aperture diaphragm S and the aspheric lens of the second lens group $G_2$, two or more negative lenses and two or more cemented surfaces are disposed (in the following examples other than Example 6, two negative lenses and two cemented surfaces are provided, and in Example 6, two negative lenses and three cemented surfaces are provided).

More specifically, it is preferable that the first lens group $G_1$ include, in order from the magnification side, the first lens $L_1$ formed as an aspheric lens which is made of plastic, a second lens $L_2$ and a third lens $L_3$ formed as negative meniscus lenses each having a convex surface directed toward the magnification side, and a cemented lens formed of a fourth lens $L_4$ which is formed as a negative lens having a concave surface directed toward the magnification side and a fifth lens $L_5$ which is formed as a positive lens having a convex surface directed toward the reduction side.

Further, it is preferable to perform focusing by moving the cemented lens of the first lens group $G_1$ in a direction of the optical axis Z.

On the other hand, more specifically, it is preferable that the second lens group $G_2$ includes, in order from the magnification side, a sixth lens $L_6$ formed as a positive lens, a seventh lens $L_7$ formed as a negative meniscus lens having a convex surface directed toward the magnification side, an eighth lens $L_8$ formed as a biconvex lens, a ninth lens $L_9$ formed as a biconcave lens, a tenth lens $L_{10}$ formed as a biconvex lens, an eleventh lens $L_{11}$ formed as an aspheric lens, a twelfth lens $L_{12}$ formed as a biconcave lens, a thirteenth lens $L_{13}$ formed as a biconvex lens, and a fourteenth lens $L_{14}$ formed as a biconvex lens. In the second lens group $G_2$, a plurality of cemented lenses is provided as shown in the following example. With such a configuration, it is possible to satisfactorily correct spherical aberration and chromatic aberration, and it is also possible to improve manufacturing efficiency of the lens system.

Further, it is preferable that the second lens group $G_2$ include two or more positive lenses (which correspond to two positive lenses of the thirteenth lens $L_{13}$ and the fourteenth lens $L_{14}$ in the following examples) of which the Abbe numbers ($v_d$) are 75 or more.

Furthermore, in the projection lens system of FIG. 1, the rays, which enter from the right side of the page in the drawing and contain image information given from an image display surface 1 of a light valve, are incident into the projection lens system through a color synthesizing prism (which includes various filters) 2, and are projected by the projection lens system in an enlarged manner toward the right side of the page. FIG. 1 only shows the one image display surface 1 for visual clarity. However, the projection type display apparatus may display a full-color image in a way that the rays originated from the light source are separated by a color separation optical system into the three primary colors and three light valves for the respective primary colors are disposed.

Further, the projection lens system according to the embodiment satisfies the following conditional expressions (1) and (2):

$$0.10 < f/f_{2-1} < 0.30 \qquad (1), \text{ and}$$

$$N_{2-1} > 1.75 \qquad (2)$$

where f denotes a focal length of the whole lens system, $f_{2-1}$ denotes a focal length of the second lens (in the examples, the sixth lens $L_6$), and $N_{2-1}$ denotes a refractive index of the second lens in the examples, the sixth lens $L_6$) at the d-line.

Furthermore, in the projection lens system according to the embodiment, it is preferable that all the lenses other than the second lens (in the following examples, the sixth lens $L_6$) and the aspheric lens (in the following examples, the eleventh lens $L_{11}$) in the lenses of the second lens group satisfy any one of the following conditional expressions (3) and (4):

$$N_{2p} < 1.55 \qquad (3), \text{ and}$$

$$N_{2n} > 1.73 \qquad (4),$$

where $N_{2p}$ denotes a refractive index of a positive lens of each of said all the lenses in the second lens group $G_2$ at the d-line, and $N_{2n}$ denotes a refractive index of a negative lens of each of said all the lenses in the second lens group $G_2$ at the d-line.

Further, it is preferable that the cemented lens of the first lens group $G_1$ satisfy the following conditional expression (5):

$$|N_{1p} - N_{1n}| < 0.1 \qquad (5),$$

where $N_{1p}$ denotes a refractive index of the positive lens constituting the cemented lens of the first lens group $G_1$ at the d-line, and $N_{1n}$ denotes a refractive index of the negative lens constituting the cemented lens of the first lens group $G_1$ at the d-line.

Furthermore, by satisfying at least the conditional expressions (1) and (2) of the above-mentioned conditional expressions, it is possible to obtain the above-mentioned advantage of the invention.

Hereinafter, respective meanings of the conditional expressions (1) to (5) will be described.

The conditional expression (1) defines a range of the focal length f of the whole system relative to the focal length of the second lens (in the examples, the sixth lens $L_6$). When the lower limit is exceeded, the size of the whole lens system increases contrary to the demand for compactness. In contrast, when the upper limit is exceeded, it is difficult to correct spherical aberration.

Furthermore, it is possible to improve the effect of the following conditional expression (1) by satisfying the following conditional expression (1') instead of the conditional expression (1):

$$0.15 < f/f_{2-1} < 0.25 \qquad (1').$$

The conditional expression (2) defines the lower limit of the refractive index of the second lens (in the examples, the sixth lens $L_6$) at the d-line. When the lower limit is exceeded, it is difficult to correct spherical aberration and field curvature.

Next, the conditional expression (3) defines the lower limit of the refractive index of the positive lens of the second lens group $G_2$ at the d-line. On the other hand, the conditional expression (4) defines the lower limit of the refractive index of the negative lens of the second lens group $G_2$ at the d-line. Unless any one of the conditional expressions (3) and (4) is satisfied, it is difficult to correct spherical aberration and longitudinal and lateral chromatic aberrations.

Furthermore, it is possible to more satisfactorily correct spherical aberration and longitudinal and lateral chromatic aberrations by satisfying the following conditional expression (4') instead of the conditional expression (4):

$$N_{2n} > 1.75 \qquad (4')$$

The conditional expression (5) defines a range of an absolute value of the difference between the refractive index $N_{1p}$ of the positive lens constituting the cemented lens in the first lens group $G_1$ at the d-line and the refractive index $N_{1n}$ of the negative lens constituting the cemented lens in the first lens group $G_1$ at the d-line. Specifically, the condition is that the difference of the refractive indices of materials for forming the two lenses constituting the cemented lens is less than 0.1. When out of this range, fluctuation in the image plane at the focus adjustment increases.

Further, the shapes of the aspheric surfaces included in the first lens group $G_1$ and the second lens group $G_2$ are defined by the following aspheric surface expression. In these aspheric lenses, it is possible to obtain the effect even when one of the surfaces is aspheric, but a lens of which both surfaces are aspheric is more preferable.

$$Z = \frac{Y^2/R}{1+\sqrt{1-K \times Y^2/R^2}} + \sum_{i=3}^{m} A_i Y^i \quad \text{[Numerical Expression 1]}$$

where

Z denotes a length of a perpendicular from a point on an aspheric surface, which is apart from the optical axis at a distance Y, to a tangential plane (a plane perpendicular to the optical axis) of the vertex of the aspheric surface, Y denotes a distance from the optical axis, R denotes a radius of curvature of an aspheric surface near the optical axis, K denotes an eccentricity, and $A_i$ denotes an aspheric coefficient (i=3 to m).

Figure 17:
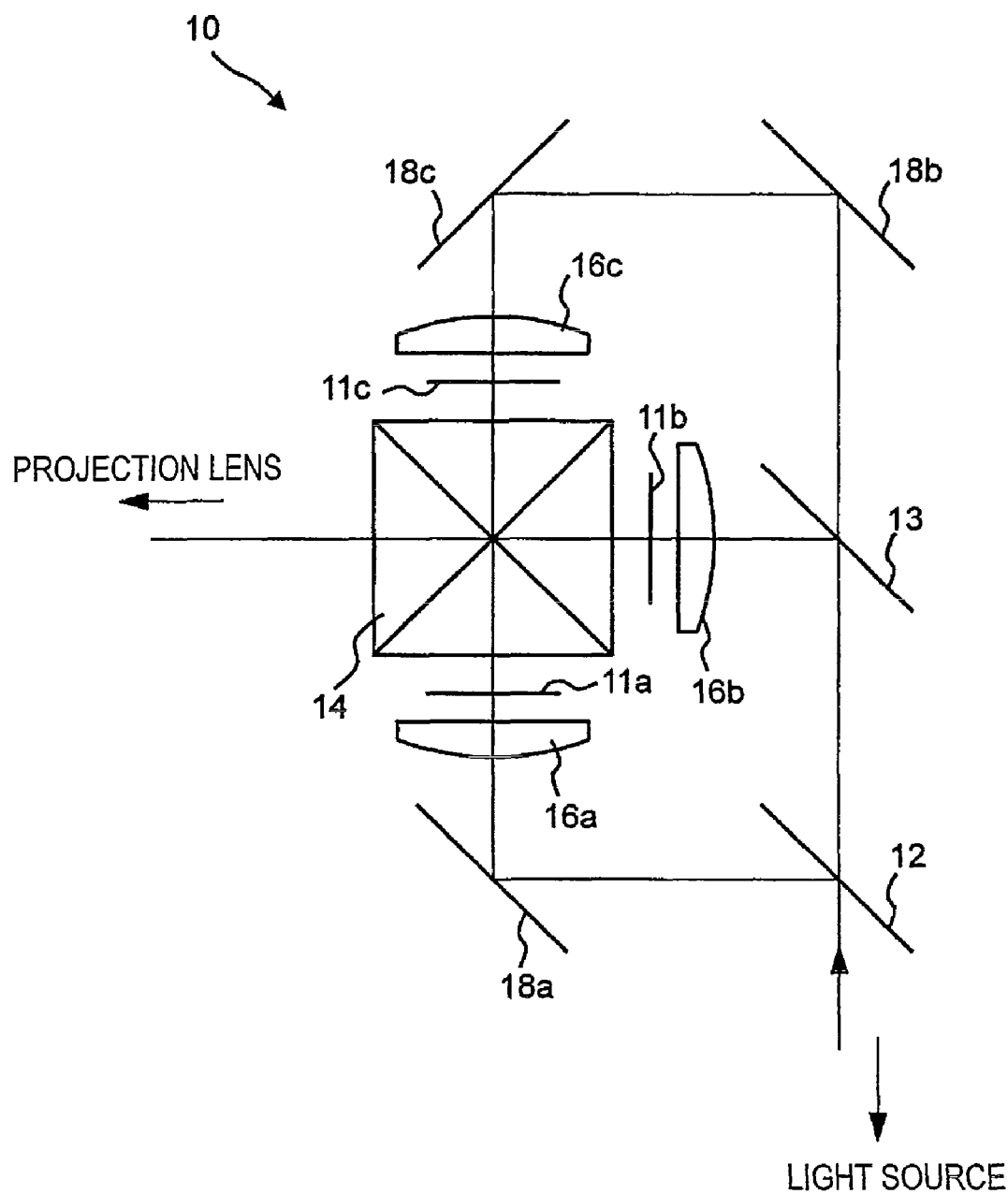
FIG. 17 is a diagram illustrating a schematic configuration of a projection type display apparatus according to an embodiment of the invention.

Next, a projection type display apparatus according to an embodiment of the invention will be described. FIG. 17 is a schematic diagram illustrating the projection type display apparatus according to the embodiment of the invention.

As shown in FIG. 17, the illumination optical system 10 includes transmissive liquid crystal panels 11a to 11c as light valves, dichroic mirrors 12 and 13 for color separation, a cross dichroic prism 14 for color synthesis, condenser lenses 16a to 16c, and total reflection mirrors 18a to 18c. Although not shown in the drawing, a white light source is disposed on the front stage of the dichroic mirror 12, white light originated from the light source is modulated by being incident on the liquid crystal panels 11a to 11c corresponding to three color rays (G light, B light, R light) through the illumination optical section, and is projected on a screen 7 from the projection lens system shown in FIG. 17.

Hereinafter, specific examples of the projection lens system according to the embodiment of the invention will be described. Furthermore, in the examples, if there are elements having the same configurations and the same operations and effects, those elements are referenced by the same reference numerals and signs.

Example 1

As shown in FIG. 1, the projection lens system according to Example 1 includes, in order from the magnification side, the first lens group $G_1$ having a negative refractive power and the second lens group $G_2$ having a positive refractive power, and is telecentric on the reduction side.

Further, the first lens group $G_1$ includes, in order from the magnification side, a first lens $L_1$ formed as an aspheric lens which has a small refractive power, a second lens $L_2$ and a third lens $L_3$ formed as negative meniscus lenses each having a concave surface directed toward the reduction side, and a two-element cemented lens formed of a fourth lens $L_4$ which is formed as a biconcave lens and a fifth lens $L_5$ which is formed as a biconvex lens.

On the other hand, the second lens group $G_2$ includes a sixth lens $L_6$ formed as a plano-convex lens, in which an aperture diaphragm 3 is disposed, having a convex surface directed toward the magnification side, a seventh lens $L_7$ formed as a negative meniscus lens having a concave surface directed toward the reduction side, an eighth lens $L_8$ formed as a biconvex lens, a ninth lens $L_9$ formed as a biconcave lens, a tenth lens $L_{10}$ formed as a biconvex lens, an eleventh lens $L_{11}$ formed as an aspheric lens which has a small refractive power, a twelfth lens $L_{12}$ formed as a biconcave lens, and a thirteenth lens $L_{13}$ and a fourteenth lens $L_{14}$ formed as biconvex lenses.

Furthermore, in the second lens group $G_2$, the seventh lens $L_7$ and the eighth lens $L_8$ are cemented to each other, and the ninth lens $L_9$ and the tenth lens $L_{10}$ are cemented to each other, and two-element cemented lenses are formed respectively.

Furthermore, the projection lens system is configured to be telecentric on the reduction side.

Furthermore, the projection lens system is configured to perform focusing by moving the cemented lens, which is formed by cementing the fourth lens $L_4$ and the fifth lens $L_5$, in the first lens group $G_1$ along the direction of the optical axis Z.

The projection lens system according to Example 1 is configured to satisfy all the conditional expressions (1) to (5), (1'), and (4').

Further, FIG. 1 shows the image display surface 1 of the light valve and the color synthesizing prism (including various filters) 2.

The top of Table 1 shows various numerical values of a focal length f (mm) of the whole system, a back focal length Bf (mm), an F number Fno., and an angle of view 2ω in Example 1.

Further, the upper part of Table 1 shows radiuses of curvature R (mm) of the lens surfaces of the projection lens system according to Example 1, center thicknesses of the lenses and air spaces between the lenses D (mm) (hereinafter, these are referred to as "on-axis surface spacings"), refractive indices $N_d$ of the lenses at the d-line, and Abbe numbers $v_d$ of the lenses at the d-line. Furthermore, in Table 1 and the following tables, each numeral of the surface numbers represents the order from the magnification side, and each surface having the reference sign * attached to the left side of each surface number is an aspheric surface. In Example 1 and the following Examples 2 to 8, the radiuses of curvature R of the aspheric surfaces are represented as values of the radiuses of curvature R on the optical axis Z in the respective tables. However, in the corresponding lens configuration diagrams, some of the extracted lines may not be extracted from the intersection between the lens surfaces and the optical axis Z for convenience of description.

Further, the middle part of Table 1 shows numerical values of the on-axis surface spacings $D_1$ and $D_2$ when focusing is performed at a predetermined (1.2 m, focus at infinity).

Furthermore, the lower part of Table 1 shows values of constants K, and $A_3$ to $A_{12}$ corresponding to the respective aspheric surfaces.

TABLE 1 f = 9.70, Bf = 30.31, Fno = 2.3, 2ω = 101.4°

| S | R | D | Nd | νd |
|---|---|---|---|---|
| *1 | −71.436 | 7.00 | 1.49100 | 57.6 |
| *2 | −420.815 | 10.00 | | |
| 3 | 38.526 | 2.20 | 1.51680 | 64.2 |
| 4 | 24.244 | 7.97 | | |
| 5 | 169.946 | 1.80 | 1.80518 | 25.5 |
| 6 | 17.916 | D1 | | |
| 7 | −27.684 | 1.50 | 1.60311 | 60.7 |
| 8 | 27.684 | 6.00 | 1.62004 | 36.3 |
| 9 | −38.636 | D2 | | |
| 10 | 40.880 | 2.61 | 1.80518 | 25.5 |
| 11 | ∞ | −1.00 | | |
| AP | ∞ | 9.41 | | |
| 13 | 27.410 | 1.20 | 1.77250 | 49.6 |
| 14 | 17.241 | 8.95 | 1.48749 | 70.4 |
| 15 | −22.620 | 0.10 | | |
| 16 | −21.854 | 1.50 | 1.77250 | 49.6 |
| 17 | 21.854 | 9.33 | 1.48749 | 70.4 |
| 18 | −21.854 | 1.79 | | |
| *19 | −919.526 | 3.20 | 1.51007 | 56.2 |
| *20 | −208.534 | 1.99 | | |
| 21 | −73.905 | 1.50 | 1.80518 | 25.5 |
| 22 | 31.974 | 6.92 | 1.49700 | 81.6 |
| 23 | −59.480 | 0.40 | | |
| 24 | 50.278 | 8.68 | 1.49700 | 81.6 |
| 25 | −33.637 | 13.00 | | |
| 26 | ∞ | 26.30 | 1.51680 | 64.2 |
| 27 | ∞ | | | |

| PROJECTION DISTANCE | D1 | D2 |
|---|---|---|
| 1.2 m | 19.44 | 21.90 |
| inf | 21.13 | 20.21 |

Aspheric Coefficient

| | *1 | *2 | *19 | *20 |
|---|---|---|---|---|
| K | −0.2 | −3.7978309 | 0 | 0 |
| A3 | 1.7756055E−04 | 2.1343861E−04 | 0 | 0 |
| A4 | 1.7405304E−05 | 8.8824027E−06 | −8.7553168E−06 | −1.5797861E−07 |
| A5 | −5.4892861E−07 | −1.0621232E−07 | −4.4405706E−06 | −3.4704604E−06 |
| A6 | 3.1144330E−09 | −4.1620250E−09 | 1.7949489E−07 | 1.6531191E−07 |
| A7 | 9.8080681E−11 | −5.0516375E−11 | 3.3102559E−08 | 3.0864841E−09 |
| A8 | −5.2542194E−13 | 4.1947132E−13 | −3.2230879E−09 | 1.3610341E−09 |
| A9 | −1.6522972E−14 | 3.1957488E−14 | 7.2297331E−11 | −2.0563223E−10 |
| A10 | −1.0328503E−17 | 4.2166010E−16 | 2.9107122E−12 | 8.3751110E−12 |
| A11 | 1.4168236E−18 | 6.2448618E−18 | | |
| A12 | 8.3890885E−21 | −3.3940750E−19 | | |

AP: Aperture Diaphragm,
*Aspheric Surface

Furthermore, values corresponding to the conditional expressions (1) to (5), (1'), and (4') in Example 1 are shown in Table 9 to be described later, and all the conditional expressions (1) to (5), (1'), and (4') are satisfied.

Example 2

Figure 2:
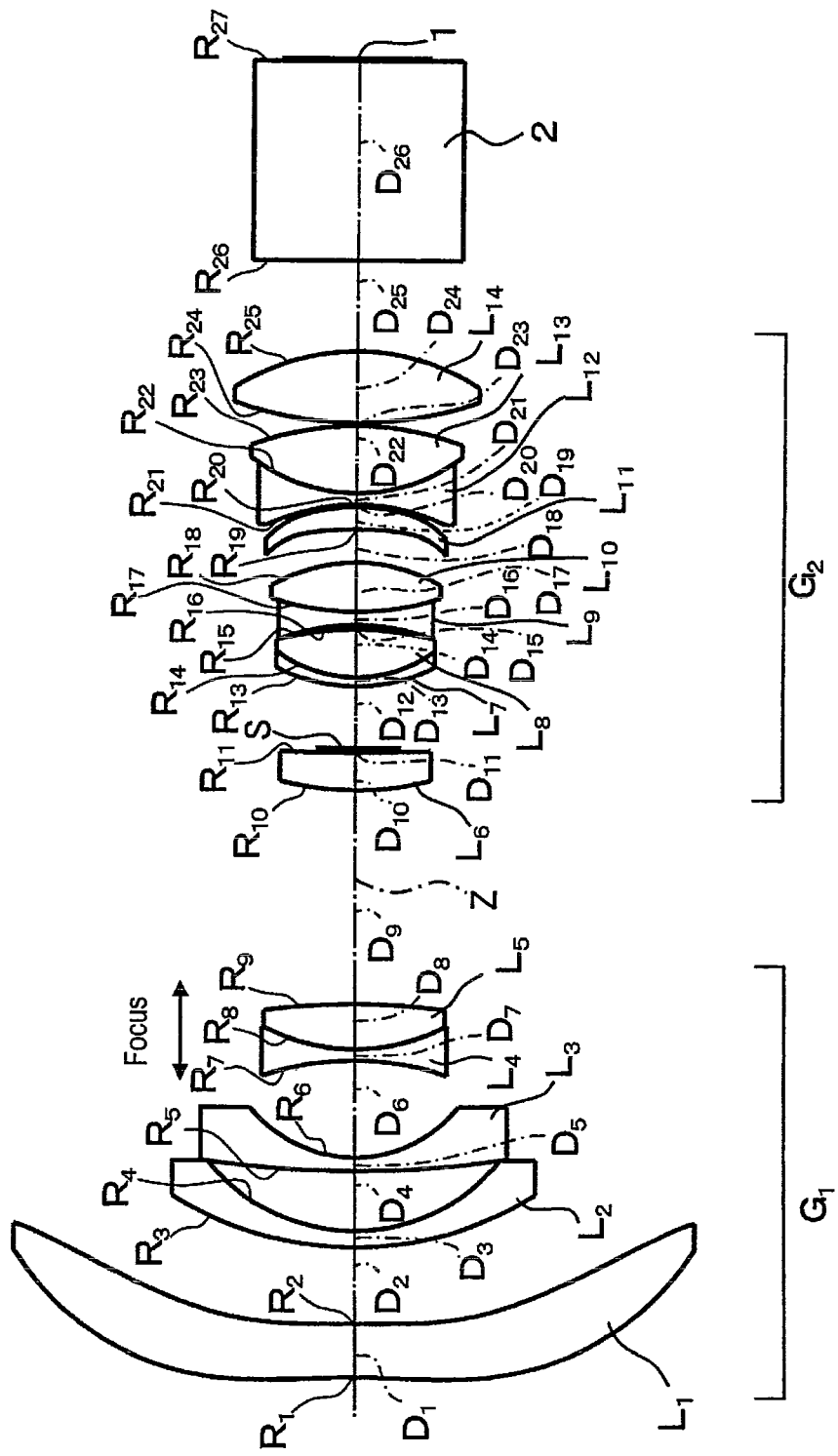
FIG. 2 is a diagram illustrating a configuration of a projection lens system according to Example 2 of the invention.

A configuration of the projection lens system according to Example 2 is shown in FIG. 2, and is basically the same as that of the projection lens system according to Example 1. However, the present configuration is different from that of the projection lens system according to Example 1 in that the aperture diaphragm S is disposed closer to the reduction side than the reduction side surface of the sixth lens $L_6$ and the sixth lens $L_6$ is formed as a positive meniscus lens having a convex surface directed toward the magnification side.

The top of Table 2 shows various numerical values of a focal length f (mm) of the whole system, a back focal length Bf (mm), an F number Fno., and an angle of view 2ω in Example 2.

Further, the upper part of Table 2 shows radiuses of curvature R (mm) of the lens surfaces of the projection lens system according to Example 2, on-axis surface spacings D (mm), refractive indices $N_d$ of the lenses at the d-line, and Abbe numbers $ν_d$ of the lenses at the d-line.

Further, the middle part of Table 2 shows numerical values of the on-axis surface spacings $D_1$ and $D_2$ when focusing is performed at a predetermined projection distance (1.2 m, focus at infinity).

Furthermore, the lower part of Table 2 shows values of constants K, and $A_3$ to $A_{12}$ corresponding to the respective aspheric surfaces.

TABLE 2 f = 9.69, Bf = 29.52, Fno = 2.3, 2ω = 101.8°

| S | R | D | Nd | νd |
|---|---|---|---|---|
| *1  | −71.429  | 7.00  | 1.49100 | 57.6 |
| *2  | −240.742 | 10.00 |         |      |
| 3   | 44.584   | 2.20  | 1.51633 | 64.1 |
| 4   | 24.558   | 7.95  |         |      |
| 5   | 129.727  | 1.80  | 1.80518 | 25.5 |
| 6   | 17.540   | D1    |         |      |
| 7   | −38.292  | 1.54  | 1.60311 | 60.7 |
| 8   | 26.038   | 6.00  | 1.69895 | 30.1 |
| 9   | −92.825  | D2    |         |      |
| 10  | 39.091   | 5.00  | 1.76182 | 26.6 |
| 11  | 234.299  | 1.00  |         |      |
| AP  | ∞        | 7.93  |         |      |
| 13  | 22.834   | 1.21  | 1.77250 | 49.6 |
| 14  | 17.241   | 6.44  | 1.48749 | 70.4 |
| 15  | −42.943  | 0.62  |         |      |
| 16  | −28.572  | 1.73  | 1.77250 | 49.6 |
| 17  | 35.988   | 6.55  | 1.51680 | 64.2 |
| 18  | −22.212  | 4.30  |         |      |
| *19 | −67.020  | 3.00  | 1.51007 | 56.2 |
| *20 | −26.862  | 0.31  |         |      |
| 21  | −27.168  | 1.50  | 1.80610 | 33.3 |
| 22  | 22.915   | 8.89  | 1.49700 | 81.6 |
| 23  | −40.482  | 0.40  |         |      |
| 24  | 49.274   | 9.54  | 1.49700 | 81.6 |
| 25  | −29.548  | 12.20 |         |      |
| 26  | ∞        | 26.30 | 1.51633 | 64.1 |
| 27  | ∞        |       |         |      |

| PROJECTION DISTANCE | D1 | D2 |
|---|---|---|
| 1.2 m | 12.81 | 28.30 |
| inf   | 13.91 | 27.20 |

Aspheric Coefficient

|     | *1              | *2              | *19             | *20             |
|-----|-----------------|-----------------|-----------------|-----------------|
| K   | −0.2            | −3.7978309      | 0               | 0               |
| A3  | 3.5901788E−04   | 4.0754623E−04   | 0               | 0               |
| A4  | 7.1705899E−06   | 8.7196204E−08   | −5.5028608E−05  | −3.3231190E−05  |
| A5  | −3.4814398E−07  | −8.3667817E−08  | −3.2103030E−06  | −1.1148841E−06  |
| A6  | 1.8047821E−09   | −1.4025236E−09  | −2.6170943E−08  | −1.0323282E−07  |
| A7  | 1.0355245E−10   | −2.8280275E−11  | 1.8102967E−08   | −4.1577161E−09  |
| A8  | −3.3986528E−13  | −6.9314746E−15  | −2.1669377E−09  | 1.3684313E−09   |
| A9  | −2.1942353E−14  | 1.9850066E−14   | 2.5230984E−12   | −1.3165964E−10  |
| A10 | −2.4118609E−16  | 4.7298344E−16   | −1.2527294E−13  | 1.0519939E−12   |
| A11 | 3.4766505E−18   | 4.6816756E−18   |                 |                 |
| A12 | 8.5829972E−20   | −2.9972958E−19  |                 |                 |

AP: Aperture Diaphragm,
*Aspheric Surface

Furthermore, values corresponding to the conditional expressions (1) to (5), (1'), and (4') in Example 2 are shown in Table 9 to be described later, and all the conditional expressions (1) to (5), (1'), and (4') are satisfied.

Example 3

Figure 3:
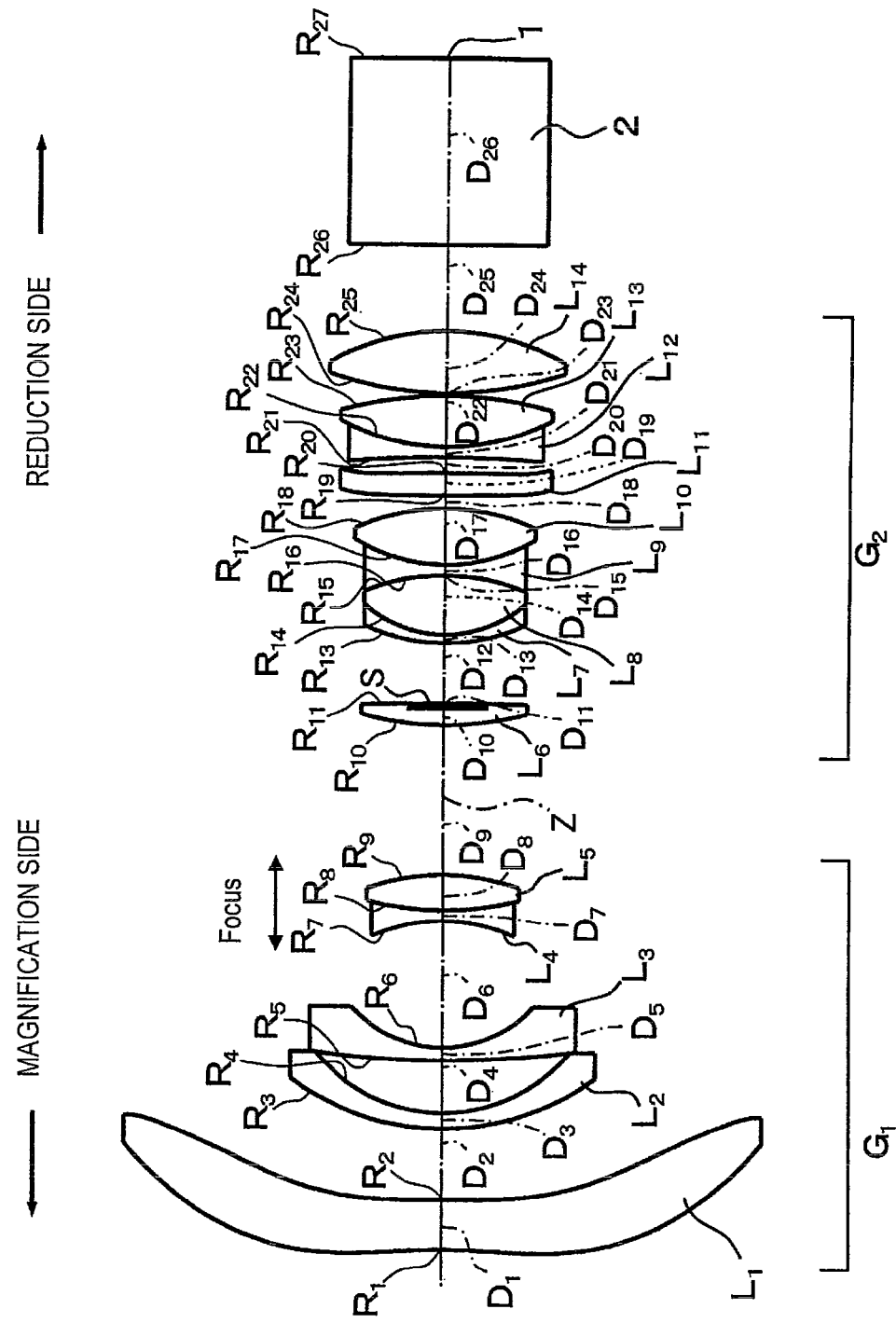
FIG. 3 is a diagram illustrating a configuration of a projection lens system according to Example 3 of the invention.

A configuration of the projection lens system according to Example 3 is shown in FIG. 3, and is basically the same as that of the projection lens system according to Example 1. However, the present configuration is different from that of the projection lens system according to Example 1 in that the sixth lens $L_6$ is formed as a biconvex lens.

The top of Table 3 shows various numerical values of a focal length f (mm) of the whole system, a back focal length Bf (mm), an F number Fno., and an angle of view 2ω in Example 3.

Further, the upper part of Table 3 shows radiuses of curvature R (mm) of the lens surfaces of the projection lens system according to Example 3, on-axis surface spacings D (mm), refractive indices $N_d$ of the lenses at the d-line, and Abbe numbers $v_d$ of the lenses at the d-line.

Further, the middle part of Table 3 shows numerical values of the on-axis surface spacings $D_1$ and $D_2$ when focusing is performed at a predetermined projection distance (1.2 m, focus at infinity).

Furthermore, the lower part of Table 3 shows values of constants K, and $A_3$ to $A_{16}$ corresponding to the respective aspheric surfaces.

TABLE 3

| | f = 9.70, Bf = 29.52, Fno = 2.0, 2ω = 101.4° | | | |
|---|---|---|---|---|
| S | R | D | Nd | νd |
| *1 | −71.429 | 7.00 | 1.49100 | 57.6 |
| *2 | −423.409 | 10.00 | | |
| 3 | 36.171 | 2.20 | 1.51680 | 64.2 |
| 4 | 23.118 | 7.37 | | |
| 5 | 137.000 | 1.80 | 1.84666 | 23.8 |
| 6 | 17.446 | D1 | | |
| 7 | −24.089 | 1.50 | 1.64000 | 60.2 |
| 8 | 43.321 | 5.00 | 1.64769 | 33.8 |
| 9 | −31.838 | D2 | | |
| 10 | 44.180 | 3.09 | 1.84666 | 23.8 |
| 11 | −425.885 | −1.00 | | |
| AP | ∞ | 9.50 | | |
| 13 | 26.663 | 1.20 | 1.83481 | 42.7 |
| 14 | 17.241 | 8.40 | 1.48749 | 70.4 |
| 15 | −29.865 | 0.10 | | |
| 16 | −28.571 | 1.50 | 1.83481 | 42.7 |
| 17 | 24.719 | 7.95 | 1.51680 | 64.2 |
| 18 | −30.757 | 1.95 | | |
| *19 | 957.189 | 3.20 | 1.51007 | 56.2 |
| *20 | −200.000 | 2.22 | | |
| 21 | −162.015 | 1.50 | 1.84666 | 23.8 |
| 22 | 31.818 | 7.24 | 1.49700 | 81.6 |
| 23 | −56.569 | 0.40 | | |
| 24 | 52.067 | 8.79 | 1.49700 | 81.6 |
| 25 | −33.722 | 12.20 | | |
| 26 | ∞ | 26.30 | 1.51633 | 64.1 |
| 27 | ∞ | | | |

| PROJECTION DISTANCE | D1 | D2 |
|---|---|---|
| 1.2 m | 17.91 | 21.38 |
| inf | 19.47 | 19.82 |

| Aspheric Coefficient | | | |
|---|---|---|---|
| | *1 | *2 | *19 | *20 |
| K | −0.2 | −3.7978309 | 0 | 0 |
| A3 | 1.6536706E−04 | 2.0873914E−04 | 0 | 0 |
| A4 | 1.9462419E−05 | 9.7600268E−06 | 2.2954828E−05 | 3.3004816E−05 |
| A5 | −6.1389797E−07 | −1.1003638E−07 | −4.4613019E−06 | −4.6026210E−06 |
| A6 | 3.2220995E−09 | −4.7897740E−09 | 1.3453631E−07 | 2.9236019E−07 |
| A7 | 1.1448297E−10 | −6.0840984E−11 | 4.2498147E−08 | 4.5018007E−09 |
| A8 | −3.3784060E−13 | 4.5406167E−13 | −3.0598722E−09 | 7.6313118E−10 |
| A9 | −1.8923987E−14 | 3.8900260E−14 | −3.1216044E−11 | −2.2629820E−10 |
| A10 | −1.5559815E−16 | 6.1910785E−16 | 5.9253708E−12 | 1.0191875E−11 |
| A11 | −3.8305295E−19 | 8.1640641E−18 | −7.2672451E−15 | 4.5810261E−15 |
| A12 | 7.4877258E−20 | −4.7479653E−19 | 5.2045367E−16 | 6.7639368E−16 |
| A13 | | | 1.1521679E−16 | 2.9016377E−17 |
| A14 | | | 1.1998512E−17 | −3.8795886E−18 |
| A15 | | | 2.8205726E−19 | 3.9118847E−19 |
| A16 | | | −1.3669204E−19 | −8.2761988E−20 |

AP: Aperture Diaphragm,
*Aspheric Surface

Furthermore, values corresponding to the conditional expressions (1) to (5), (1'), and (4') in Example 3 are shown in Table 9 to be described later, and all the conditional expressions (1) to (5), (1'), and (4') are satisfied.

Example 4

Figure 4:
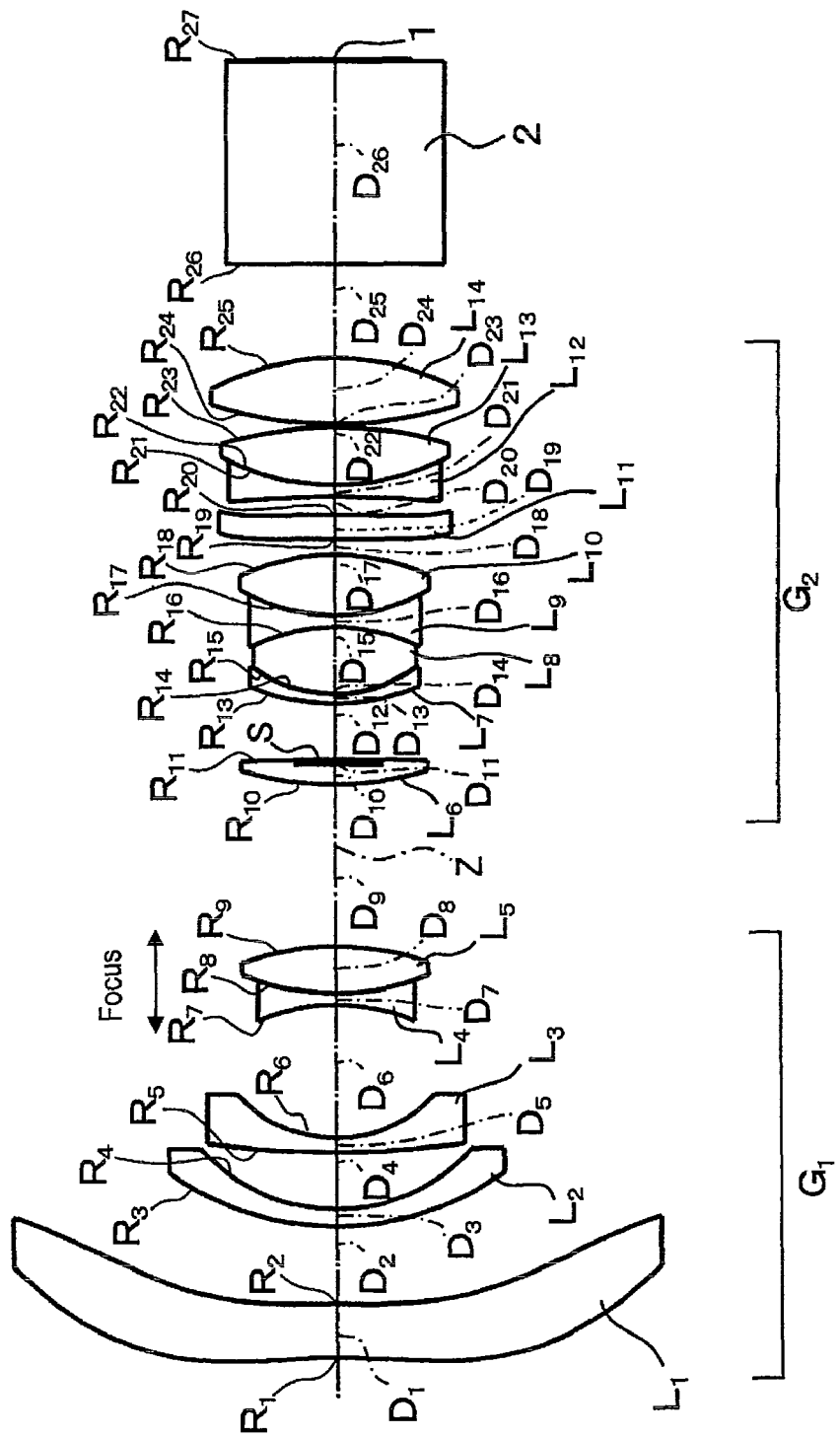
FIG. 4 is a diagram illustrating a configuration of a projection lens system according to Example 4 of the invention.

A configuration of the projection lens system according to Example 4 is shown in FIG. 4, and is basically the same as that of the projection lens system according to Example 1. However, the present configuration is different from that of the projection lens system according to Example 1 in that the sixth lens $L_6$ is formed as a biconvex lens, the seventh lens $L_7$ is formed as a single lens, and a three-element cemented lens is formed by cementing the eighth lens $L_8$, the ninth lens $L_9$, and the tenth lens $L_{10}$ in this order.

The top of Table 4 shows various numerical values of a focal length f (mm) of the whole system, a back focal length Bf (mm), an F number Fno., and an angle of view 2ω in Example 4.

Further, the upper part of Table 4 shows radiuses of curvature R (mm) of the lens surfaces of the projection lens system according to Example 4, on-axis surface spacings D (mm), refractive indices $N_d$ of the lenses at the d-line, and Abbe numbers $ν_d$ of the lenses at the d-line.

Further, the middle part of Table 4 shows numerical values of the on-axis surface spacings $D_1$ and $D_2$ when focusing is performed at a predetermined projection distance (1.2 m, focus at infinity).

Furthermore, the lower part of Table 4 shows values of constants K, and $A_3$ to $A_{16}$ corresponding to the respective aspheric surfaces.

TABLE 4

| f = 9.69, Bf = 29.52, Fno = 2.0, 2ω = 101.4° | | | | |
|---|---|---|---|---|
| S | R | D | Nd | νd |
| *1 | −71.429 | 7.00 | 1.49100 | 57.6 |
| *2 | −360.503 | 10.00 | | |
| 3 | 37.267 | 2.20 | 1.51680 | 64.2 |
| 4 | 23.378 | 7.40 | | |
| 5 | 127.155 | 1.80 | 1.84666 | 23.8 |
| 6 | 17.129 | D1 | | |
| 7 | −24.879 | 1.50 | 1.60311 | 60.7 |
| 8 | 31.392 | 6.00 | 1.62004 | 36.3 |
| 9 | −35.434 | D2 | | |
| 10 | 41.630 | 3.22 | 1.84666 | 23.8 |
| 11 | −372.150 | −1.00 | | |
| AP | ∞ | 8.33 | | |
| 13 | 27.513 | 1.20 | 1.80400 | 46.6 |
| 14 | 17.241 | 0.10 | | |
| 15 | 17.374 | 8.67 | 1.48749 | 70.4 |
| 16 | −24.133 | 1.50 | 1.83481 | 42.7 |
| 17 | 23.963 | 7.85 | 1.51680 | 64.2 |
| 18 | −28.409 | 2.01 | | |
| *19 | 2343.358 | 3.20 | 1.51007 | 56.2 |
| *20 | −199.988 | 2.41 | | |
| 21 | −136.812 | 1.50 | 1.84666 | 23.8 |
| 22 | 30.517 | 7.61 | 1.49700 | 81.6 |
| 23 | −51.258 | 0.40 | | |
| 24 | 52.034 | 8.62 | 1.49700 | 81.6 |
| 25 | −33.557 | 12.20 | | |
| 26 | ∞ | 26.30 | 1.51633 | 64.1 |
| 27 | ∞ | | | |

| PROJECTION DISTANCE | D1 | D2 |
|---|---|---|
| 1.2 m | 17.23 | 21.33 |
| inf | 18.59 | 19.97 |

| Aspheric Coefficient | | | | |
|---|---|---|---|---|
| | *1 | *2 | *19 | *20 |
| K | −0.2 | −3.7978309 | 0 | 0 |
| A3 | 1.6977803E−04 | 2.1189376E−04 | 0 | 0 |
| A4 | 1.9277078E−05 | 9.7683723E−06 | 2.3964874E−05 | 3.2906105E−05 |
| A5 | −6.1173583E−07 | −1.1016386E−07 | −4.5560093E−06 | −4.6542662E−06 |
| A6 | 3.2991797E−09 | −4.8014509E−09 | 1.2642946E−07 | 2.8824687E−07 |
| A7 | 1.1475018E−10 | −6.1139883E−11 | 4.2275418E−08 | 4.1290186E−09 |
| A8 | −3.5565871E−13 | 4.4887829E−13 | −3.0488724E−09 | 7.4391795E−10 |
| A9 | −1.9472121E−14 | 3.8840552E−14 | −2.9056328E−11 | −2.2621346E−10 |
| A10 | −1.6429126E−16 | 6.1938280E−16 | 6.1411881E−12 | 1.0319876E−11 |
| A11 | −3.9490861E−19 | 8.2256912E−18 | 1.0175896E−14 | 2.0046380E−14 |
| A12 | 7.9986501E−20 | −4.7141376E−19 | 1.6602866E−15 | 1.9147093E−15 |
| A13 | | | 1.6333718E−16 | 1.0416743E−16 |
| A14 | | | 1.0738784E−17 | 1.4106586E−18 |
| A15 | | | −1.1681298E−18 | −6.5604184E−19 |
| A16 | | | −1.0724859E−19 | −9.4855253E−20 |

AP: Aperture Diaphragm,
*Aspheric Surface

Furthermore, values corresponding to the conditional expressions (1) to (5), (1'), and (4') in Example 4 are shown in Table 9 to be described later, and all the conditional expressions (1) to (5), (1'), and (4') are satisfied.

Example 5

Figure 5:
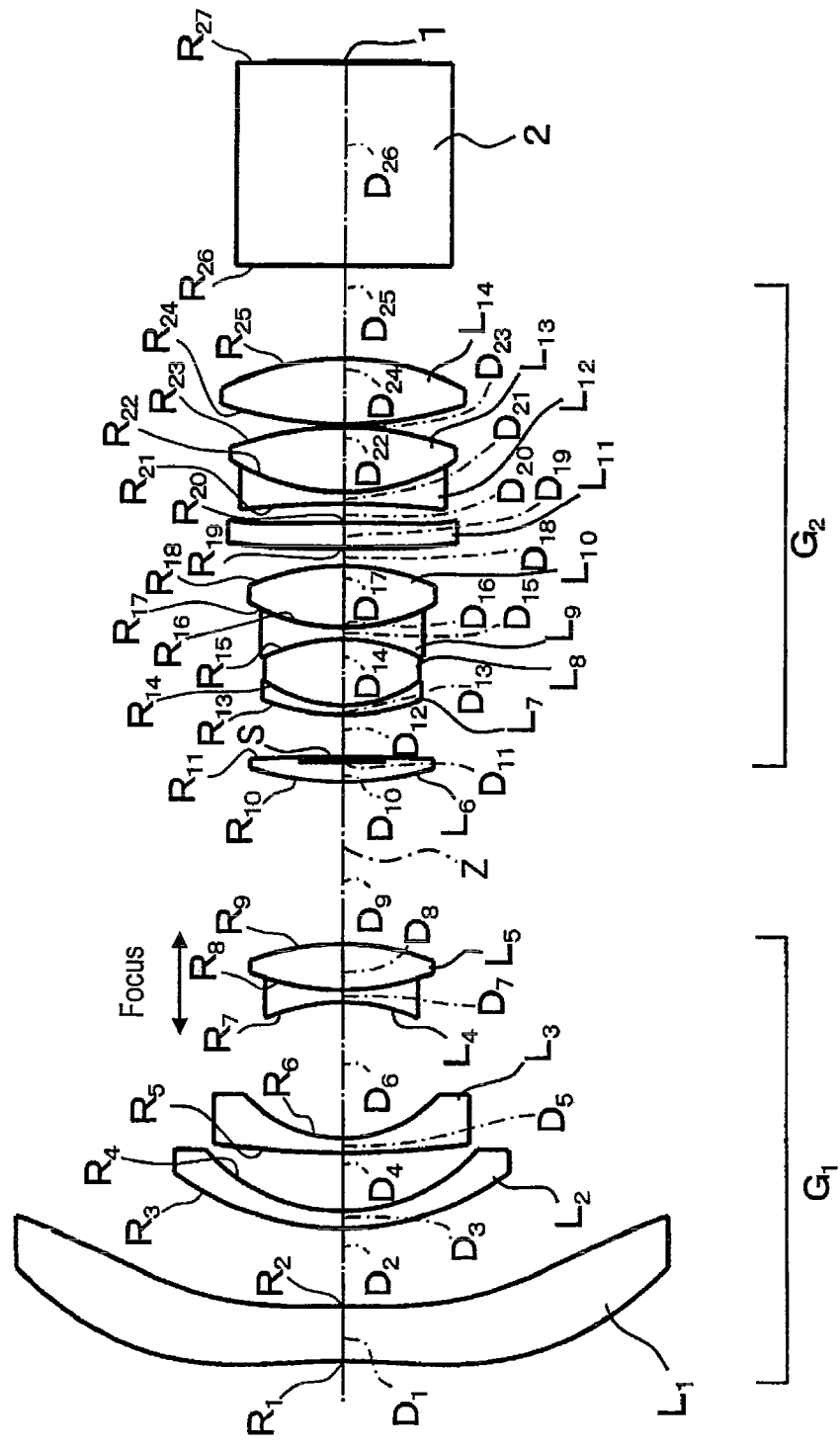
FIG. 5 is a diagram illustrating a configuration of a projection lens system according to Example 5 of the invention.

A configuration of the projection lens system according to Example 5 is shown in FIG. 5, and is basically the same as that of the projection lens system according to Example 1. However, the present configuration is different from that of the projection lens system according to Example 1 in that the sixth lens $L_6$ is formed as a biconvex lens, a three-element cemented lens is formed by cementing the seventh lens $L_7$, the eighth lens $L_8$, and the ninth lens $L_9$ in this order, and the tenth lens $L_{10}$ is formed as a single lens.

The top of Table 5 shows various numerical values of a focal length f (mm) of the whole system, a back focal length Bf (mm), an F number Fno., and an angle of view 2ω in Example 5.

Further, the upper part of Table 5 shows radiuses of curvature R (mm) of the lens surfaces of the projection lens system according to Example 5, on-axis surface spacings D (mm), refractive indices $N_d$ of the lenses at the d-line, and Abbe numbers $ν_d$ of the lenses at the d-line.

Further, the middle part of Table 5 shows numerical values of the on-axis surface spacings $D_1$ and $D_2$ when focusing is performed at a predetermined projection distance (1.2 m, focus at infinity).

Furthermore, the lower part of Table 5 shows values of constants K, and $A_3$ to $A_{16}$ corresponding to the respective aspheric surfaces.

TABLE 5 f = 9.69, Bf = 29.52, Fno = 2.0, 2ω = 101.4°

| S | R | D | Nd | νd |
|---|---|---|---|---|
| *1 | −71.425 | 6.99 | 1.49100 | 57.6 |
| *2 | −418.207 | 10.00 | | |
| 3 | 36.837 | 2.20 | 1.51680 | 64.2 |
| 4 | 23.804 | 7.64 | | |
| 5 | 132.082 | 1.80 | 1.84666 | 23.8 |
| 6 | 17.168 | D1 | | |
| 7 | −24.141 | 1.50 | 1.60311 | 60.7 |
| 8 | 33.259 | 6.00 | 1.62004 | 36.3 |
| 9 | −34.180 | D2 | | |
| 10 | 40.226 | 3.35 | 1.84666 | 23.8 |
| 11 | −274.319 | −1.00 | | |
| AP | ∞ | 6.48 | | |
| 13 | 29.113 | 1.20 | 1.80400 | 46.6 |
| 14 | 17.242 | 8.79 | 1.48749 | 70.4 |
| 15 | −23.729 | 1.50 | 1.83481 | 42.7 |
| 16 | 25.318 | 0.10 | | |
| 17 | 25.406 | 8.01 | 1.51680 | 64.2 |
| 18 | −30.116 | 2.33 | | |
| *19 | 700.861 | 3.20 | 1.51007 | 56.2 |
| *20 | −199.991 | 2.48 | | |
| 21 | −116.906 | 1.50 | 1.84666 | 23.8 |
| 22 | 28.134 | 8.40 | 1.49700 | 81.6 |
| 23 | −43.413 | 0.40 | | |
| 24 | 49.433 | 8.51 | 1.49700 | 81.6 |
| 25 | −35.443 | 12.20 | | |
| 26 | ∞ | 26.30 | 1.51633 | 64.1 |
| 27 | ∞ | | | |

| PROJECTION DISTANCE | D1 | D2 |
|---|---|---|
| 1.2 m | 17.74 | 20.93 |
| inf | 19.11 | 19.56 |

Aspheric Coefficient

| | *1 | *2 | *19 | *20 |
|---|---|---|---|---|
| K | −0.2 | −3.7978309 | 0 | 0 |
| A3 | 1.7410134E−04 | 2.1492956E−04 | 0 | 0 |
| A4 | 1.9059695E−05 | 9.7540840E−06 | 2.4744871E−05 | 3.2854052E−05 |
| A5 | −6.0664608E−07 | −1.1179819E−07 | −4.5095881E−06 | −4.5377385E−06 |
| A6 | 3.2295799E−09 | −4.8224809E−09 | 1.3202839E−07 | 2.8759880E−07 |
| A7 | 1.1359322E−10 | −6.1257411E−11 | 4.2298399E−08 | 3.4834088E−09 |
| A8 | −3.4900522E−13 | 4.4967065E−13 | −3.1032271E−09 | 6.8764609E−10 |
| A9 | −1.8909618E−14 | 3.8867470E−14 | −3.6449793E−11 | −2.2900046E−10 |
| A10 | −1.5306522E−16 | 6.2018531E−16 | 5.5689720E−12 | 1.0256457E−11 |
| A11 | −3.6304208E−19 | 8.2375063E−18 | −1.3606010E−14 | 2.2636650E−14 |
| A12 | 7.3147531E−20 | −4.7029737E−19 | 2.3799239E−15 | 2.2776780E−15 |
| A13 | | | 4.3813640E−16 | 1.3873957E−16 |
| A14 | | | 5.5918097E−17 | 1.5473371E−18 |
| A15 | | | −6.7447336E−19 | 8.6219366E−19 |
| A16 | | | −3.7636315E−19 | −1.9601112E−19 |

AP: Aperture Diaphragm,
*Aspheric Surface

Furthermore, values corresponding to the conditional expressions (1) to (5), (1'), and (4') in Example 5 are shown in Table 9 to be described later, and all the conditional expressions (1) to (5), (1'), and (4') are satisfied.

Example 6

Figure 6:
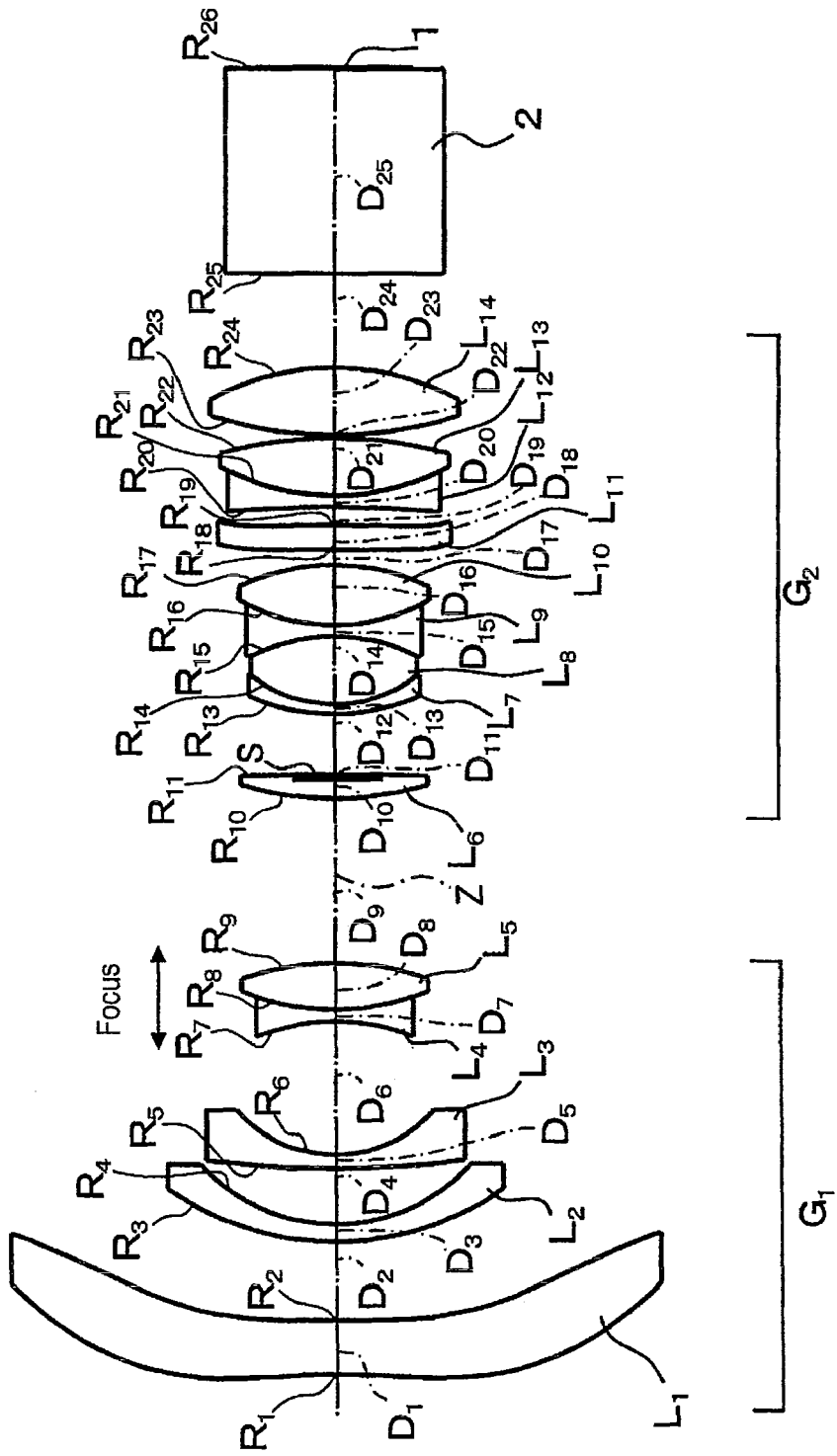
FIG. 6 is a diagram illustrating a configuration of a projection lens system according to Example 6 of the invention.

A configuration of the projection lens system according to Example 6 is shown in FIG. 6, and is basically the same as that of the projection lens system according to Example 1. However, the present configuration is different from that of the projection lens system according to Example 1 in that the sixth lens $L_6$ is formed as a biconvex lens and a four-element cemented lens is formed by cementing the seventh lens $L_7$, the eighth lens $L_8$, the ninth lens $L_9$, and the tenth lens $L_{10}$ in this order.

The top of Table 6 shows various numerical values of a focal length f (mm) of the whole system, a back focal length Bf (mm), an F number Fno., and an angle of view 2ω in Example 6.

Further, the upper part of Table 6 shows radiuses of curvature R (mm) of the lens surfaces of the projection lens system according to Example 6, on-axis surface spacings D (mm), refractive indices $N_d$ of the lenses at the d-line, and Abbe numbers $v_d$ of the lenses at the d-line.

Further, the middle part of Table 6 shows numerical values of the on-axis surface spacings $D_1$ and $D_2$ when focusing is performed at a predetermined projection distance (1.2 m, focus at infinity).

Furthermore, the lower part of Table 6 shows values of constants K, and $A_3$ to $A_{16}$ corresponding to the respective aspheric surfaces.

TABLE 6 f = 9.69, Bf = 29.52, Fno = 2.0, 2ω = 101.4°

| S | R | D | Nd | νd |
|---|---|---|---|---|
| *1 | −71.429 | 7.00 | 1.49100 | 57.6 |
| *2 | −356.878 | 10.00 | | |
| 3 | 37.385 | 2.20 | 1.51680 | 64.2 |
| 4 | 23.180 | 7.21 | | |
| 5 | 127.183 | 1.80 | 1.84666 | 23.8 |
| 6 | 17.152 | D1 | | |
| 7 | −25.229 | 1.50 | 1.60311 | 60.7 |
| 8 | 30.603 | 6.00 | 1.62004 | 36.3 |
| 9 | −35.987 | D2 | | |
| 10 | 42.395 | 3.20 | 1.84666 | 23.8 |
| 11 | −357.682 | −1.00 | | |
| AP | ∞ | 8.80 | | |
| 13 | 27.610 | 1.20 | 1.80400 | 46.6 |
| 14 | 17.241 | 8.78 | 1.48749 | 70.4 |
| 15 | −23.691 | 1.50 | 1.83481 | 42.7 |
| 16 | 24.412 | 7.89 | 1.51680 | 64.2 |
| 17 | −28.187 | 1.93 | | |
| *18 | 2980.825 | 3.20 | 1.51007 | 56.2 |
| *19 | −199.987 | 2.32 | | |
| 20 | −160.139 | 1.50 | 1.84666 | 23.8 |
| 21 | 30.484 | 7.49 | 1.49700 | 81.6 |
| 22 | −55.247 | 0.40 | | |
| 23 | 51.991 | 8.66 | 1.49700 | 81.6 |
| 24 | −33.408 | 12.20 | | |
| 25 | ∞ | 26.30 | 1.51633 | 64.1 |
| 26 | ∞ | | | |

| PROJECTION DISTANCE | D1 | D2 |
|---|---|---|
| 1.2 m | 17.11 | 21.39 |
| inf | 18.46 | 20.04 |

Aspheric Coefficient

| | *1 | *2 | *18 | *19 |
|---|---|---|---|---|
| K | −0.2 | −3.7978309 | 0 | 0 |
| A3 | 1.6833179E−04 | 2.0990905E−04 | 0 | 0 |
| A4 | 1.9321348E−05 | 9.7605422E−06 | 2.3764948E−05 | 3.3090058E−05 |
| A5 | −6.1197444E−07 | −1.0989508E−07 | −4.5455659E−06 | −4.6900465E−06 |
| A6 | 3.2983337E−09 | −4.7913099E−09 | 1.2609611E−07 | 2.8755154E−07 |
| A7 | 1.1479153E−10 | −6.0890271E−11 | 4.2224246E−08 | 4.2469918E−09 |
| A8 | −3.5426417E−13 | 4.5385919E−13 | −3.0479460E−09 | 7.5823045E−10 |
| A9 | −1.9446689E−14 | 3.8913996E−14 | −2.8454361E−11 | −2.2535191E−10 |
| A10 | −1.6394940E−16 | 6.1967508E−16 | 6.2039243E−12 | 1.0334968E−11 |
| A11 | −3.9411057E−19 | 8.1821722E−18 | 1.2063677E−14 | 1.6398611E−14 |
| A12 | 7.9878294E−20 | −4.7390034E−19 | 1.1616194E−15 | 1.3204175E−15 |
| A13 | | | 4.0378809E−17 | 4.9117093E−17 |
| A14 | | | −8.3751689E−18 | −4.3161718E−18 |
| A15 | | | 5.1619742E−19 | −1.0212228E−18 |
| A16 | | | −9.9490178E−20 | −2.6426786E−20 |

AP: Aperture Diaphragm,
*Aspheric Surface

Furthermore, values corresponding to the conditional expressions (1) to (5), (1'), and (4') in Example 6 are shown in Table 9 to be described later, and all the conditional expressions (1) to (5), (1'), and (4') are satisfied.

Example 7

Figure 7:
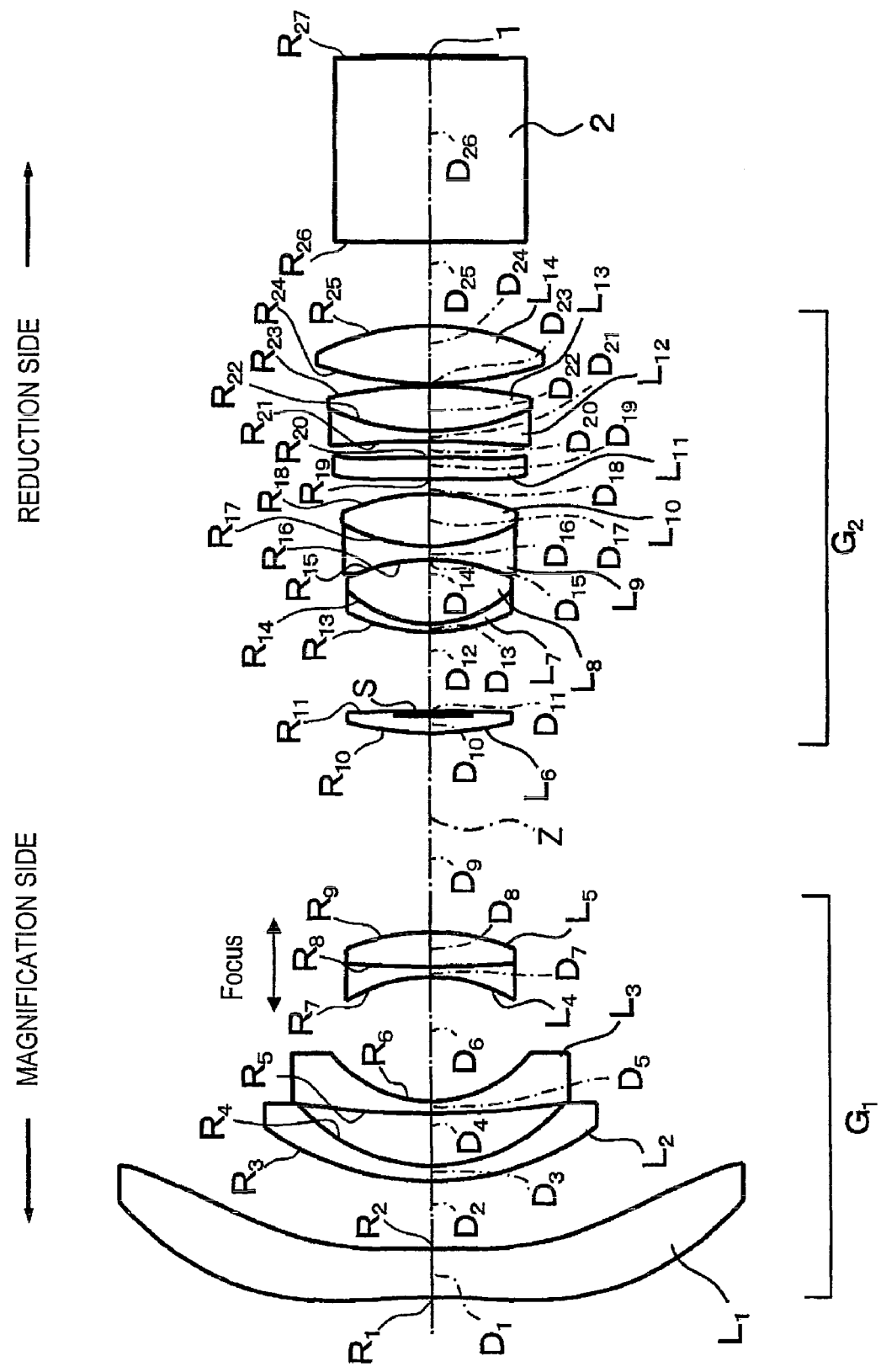
FIG. 7 is a diagram illustrating a configuration of a projection lens system according to Example 7 of the invention.

A configuration of the projection lens system according to Example 7 is shown in FIG. 7, and is basically the same as that of the projection lens system according to Example 1. However, the present configuration is different from that of the projection lens system according to Example 1 in that the sixth lens $L_6$ is formed as a biconvex lens.

The top of Table 7 shows various numerical values of a focal length f (mm) of the whole system, a back focal length Bf (mm), an F number Fno., and an angle of view 2ω in Example 7.

Further, the upper part of Table 7 shows radiuses of curvature R (mm) of the lens surfaces of the projection lens system according to Example 7, on-axis surface spacings D (mm), refractive indices $N_d$ of the lenses at the d-line, and Abbe numbers $v_d$ of the lenses at the d-line.

Further, the middle part of Table 7 shows numerical values of the on-axis surface spacings $D_1$ and $D_2$ when focusing is performed at a predetermined projection distance (1.2 m, focus at infinity).

Furthermore, the lower part of Table 7 shows values of constants K, and $A_3$ to $A_{16}$ corresponding to the respective aspheric surfaces.

TABLE 7

| | f = 9.70, Bf = 29.52, Fno = 2.1, 2ω = 101.4° | | | |
|---|---|---|---|---|
| S | R | D | Nd | νd |
| *1 | −71.431 | 7.00 | 1.49100 | 57.6 |
| *2 | −444.555 | 9.77 | | |
| 3 | 40.830 | 2.20 | 1.51680 | 64.2 |
| 4 | 25.056 | 7.56 | | |
| 5 | 124.236 | 1.80 | 1.84666 | 23.8 |
| 6 | 18.659 | D1 | | |
| 7 | −24.262 | 1.50 | 1.64000 | 60.2 |
| 8 | 154.289 | 5.00 | 1.64769 | 33.8 |
| 9 | −31.952 | D2 | | |
| 10 | 47.140 | 3.14 | 1.84666 | 23.8 |
| 11 | −592.417 | −1.00 | | |
| AP | ∞ | 12.54 | | |
| 13 | 26.466 | 1.20 | 1.83481 | 42.7 |
| 14 | 17.241 | 9.18 | 1.48749 | 70.4 |
| 15 | −29.880 | 0.10 | | |
| 16 | −28.572 | 1.91 | 1.83481 | 42.7 |
| 17 | 26.466 | 7.58 | 1.51680 | 64.2 |
| 18 | −31.749 | 2.19 | | |
| *19 | 2819.547 | 3.20 | 1.51007 | 56.2 |
| *20 | −199.982 | 2.36 | | |
| 21 | −153.239 | 1.50 | 1.84666 | 23.8 |
| 22 | 34.392 | 6.50 | 1.49700 | 81.6 |
| 23 | −64.656 | 0.40 | | |
| 24 | 51.110 | 8.39 | 1.49700 | 81.6 |
| 25 | −35.621 | 12.20 | | |
| 26 | ∞ | 26.30 | 1.51633 | 64.1 |
| 27 | ∞ | | | |

| PROJECTION DISTANCE | D1 | D2 |
|---|---|---|
| 1.2 m | 17.81 | 29.18 |
| inf | 19.39 | 27.60 |

| Aspheric Coefficient | | | | |
|---|---|---|---|---|
| | *1 | *2 | *19 | *20 |
| K | −0.2 | −3.7978309 | 0 | 0 |
| A3 | 1.5318657E−04 | 1.9317991E−04 | 0 | 0 |
| A4 | 1.9321882E−05 | 9.9369147E−06 | 2.2305105E−05 | 3.1008126E−05 |
| A5 | −6.0290280E−07 | −1.0652132E−07 | −4.4115170E−06 | −4.6572069E−06 |
| A6 | 3.1844727E−09 | −4.7427467E−09 | 1.3744741E−07 | 2.9344260E−07 |
| A7 | 1.1173903E−10 | −6.0695290E−11 | 4.2425789E−08 | 5.0516014E−09 |
| A8 | −3.8537479E−13 | 4.3830166E−13 | −3.0630131E−09 | 8.0491557E−10 |
| A9 | −1.9362079E−14 | 3.8305432E−14 | −3.0084105E−11 | −2.2535839E−10 |
| A10 | −1.5270533E−16 | 6.0745261E−16 | 6.0710895E−12 | 1.0065481E−11 |
| A11 | −1.0859243E−19 | 8.1734549E−18 | −1.2712500E−15 | −1.3089441E−14 |
| A12 | 8.3988601E−20 | −4.6106932E−19 | −9.1140151E−17 | −4.3958972E−16 |
| A13 | | | 8.7683268E−19 | 2.4644766E−17 |
| A14 | | | 1.2258625E−17 | 1.1163976E−18 |
| A15 | | | 1.2270031E−18 | 2.4224543E−18 |
| A16 | | | −1.7414832E−19 | −1.9988236E−19 |

AP: Aperture Diaphragm,
*Aspheric Surface

Furthermore, values corresponding to the conditional expressions (1) to (5), (1'), and (4') in Example 7 are shown in Table 9 to be described later, and all the conditional expressions (1) to (5), (1'), and (4') are satisfied.

Example 8

Figure 8:
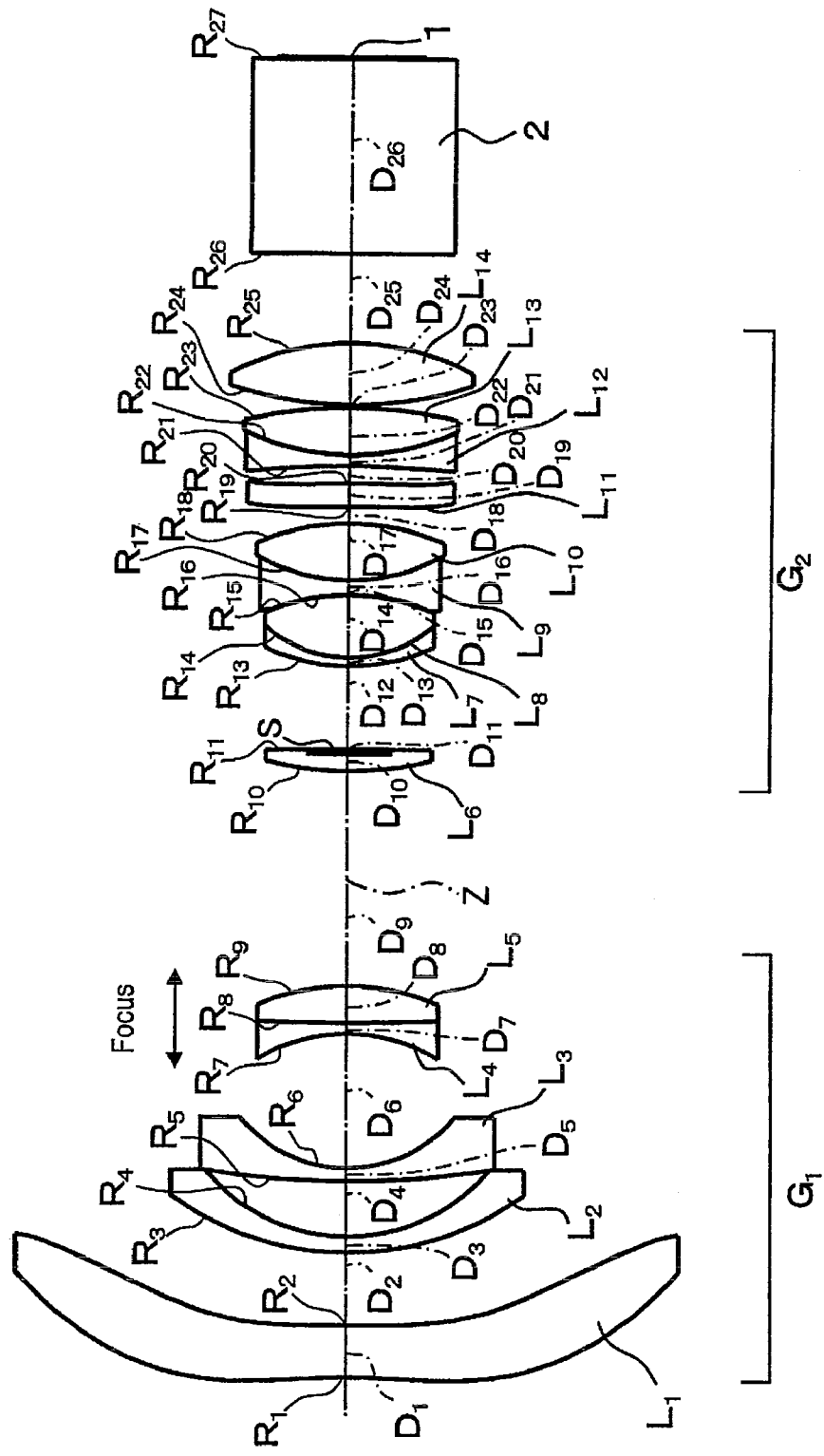
FIG. 8 is a diagram illustrating a configuration of a projection lens system according to Example 8 of the invention.
Figure 9:
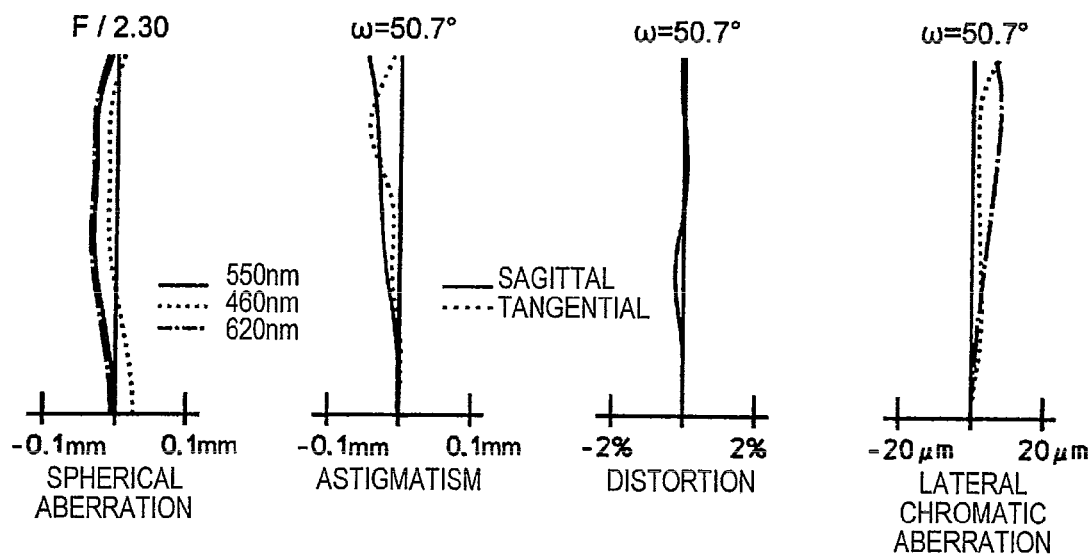
FIG. 9 is a diagram illustrating various aberrations of the projection lens system according to Example 1.
Figure 10:
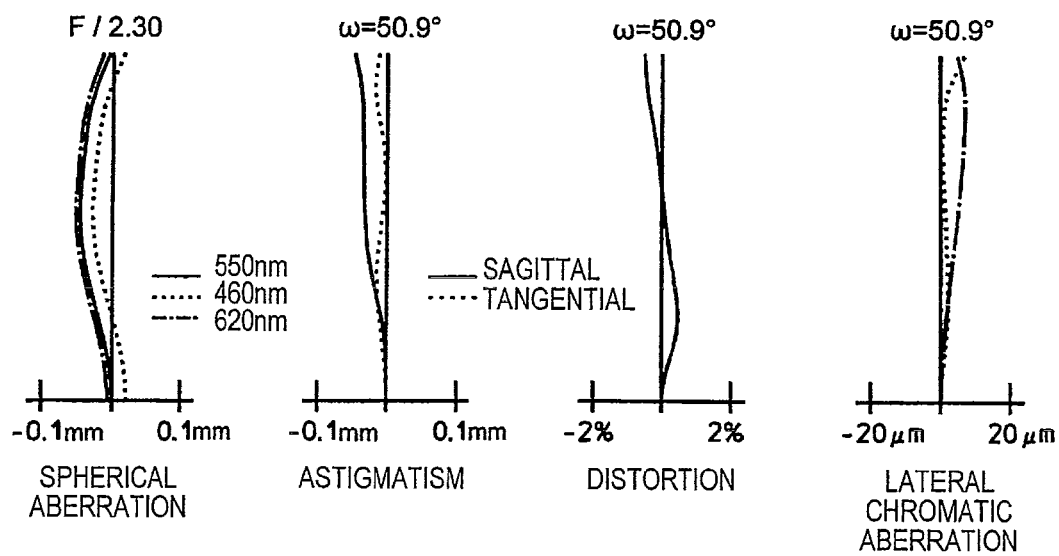
FIG. 10 is a diagram illustrating various aberrations of the projection lens system according to Example 2.
Figure 11:
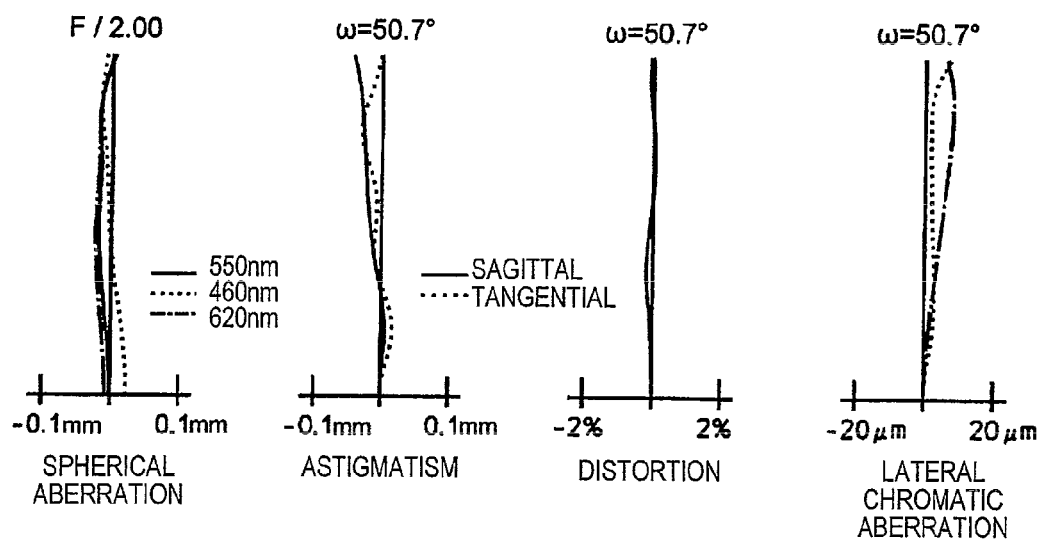
FIG. 11 is a diagram illustrating various aberrations of the projection lens system according to Example 3.
Figure 12:
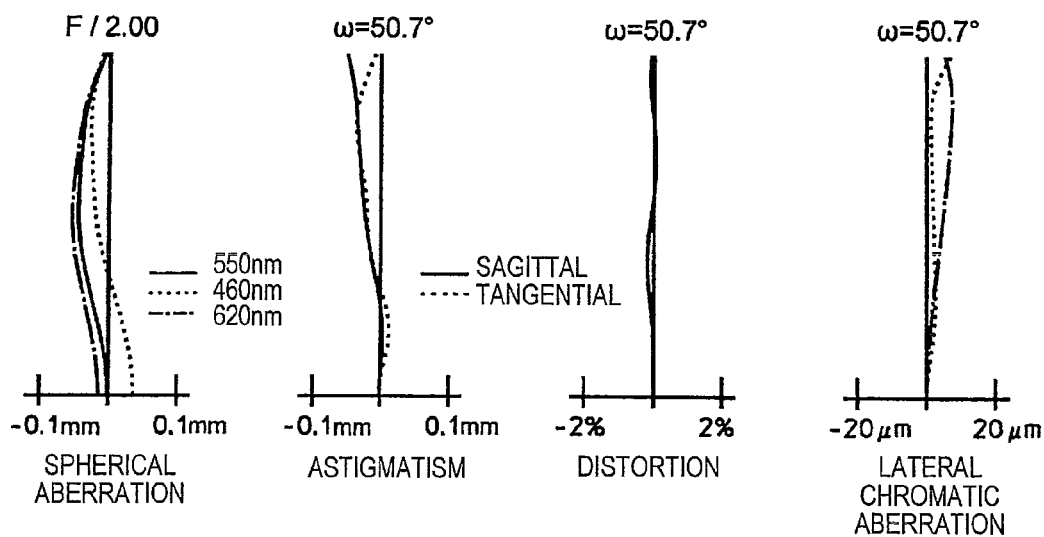
FIG. 12 is a diagram illustrating various aberrations of the projection lens system according to Example 4.
Figure 13:
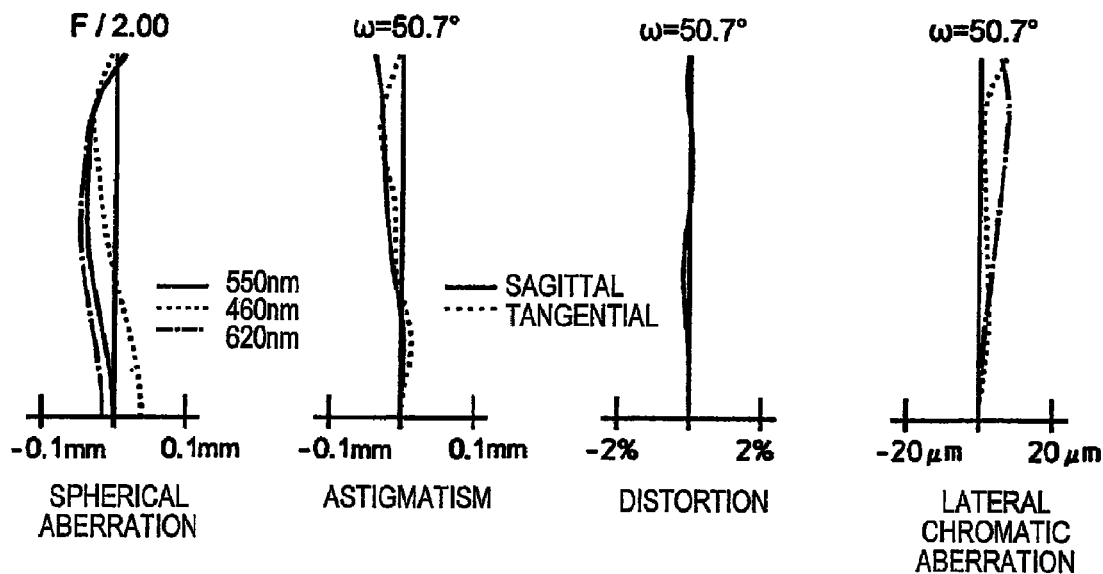
FIG. 13 is a diagram illustrating various aberrations of the projection lens system according to Example 5.
Figure 14:
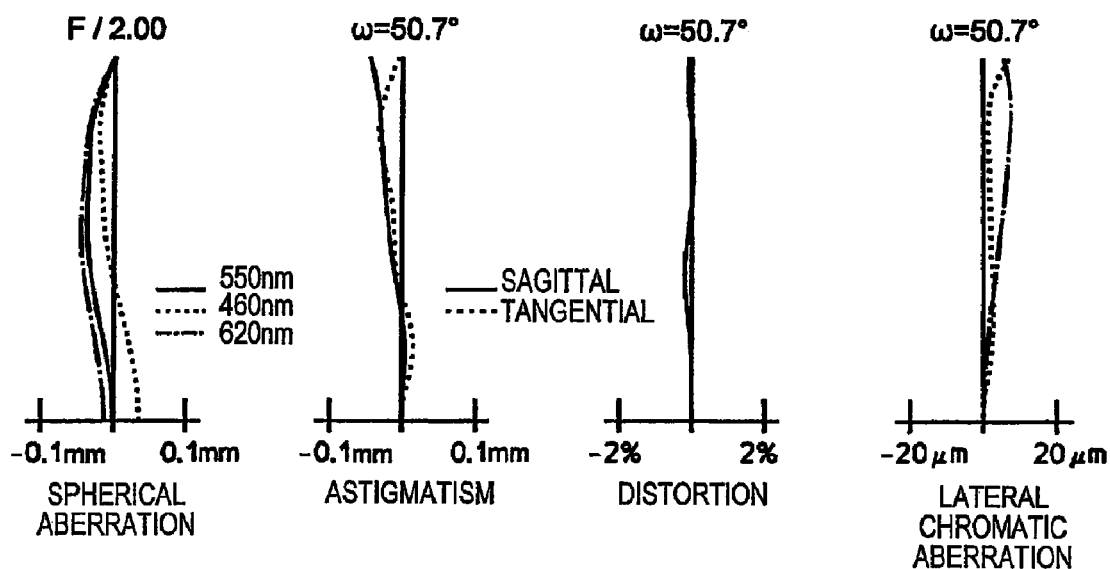
FIG. 14 is a diagram illustrating various aberrations of the projection lens system according to Example 6.
Figure 15:
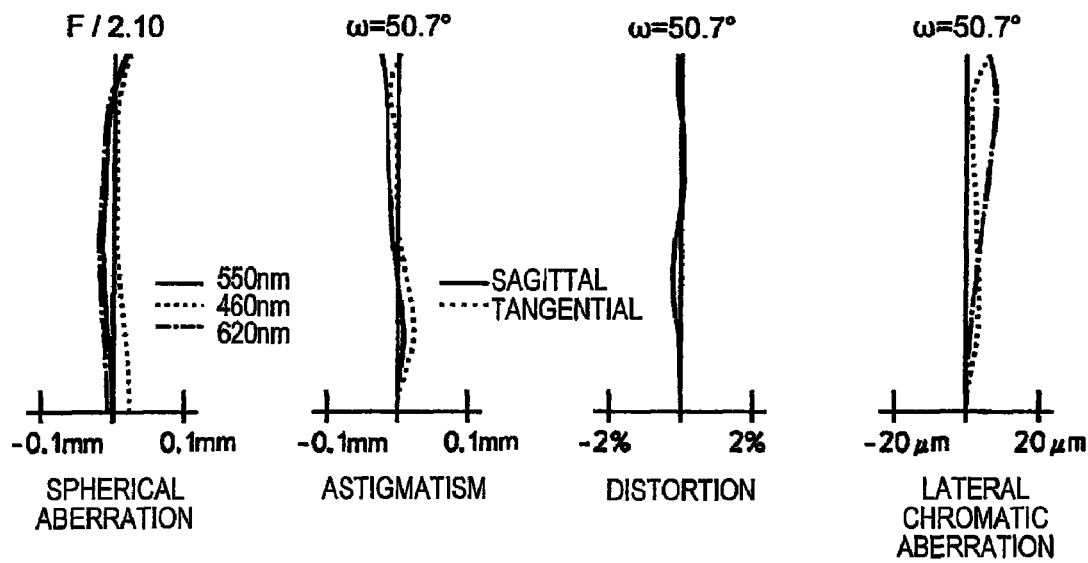
FIG. 15 is a diagram illustrating various aberrations of the projection lens system according to Example 7.
Figure 16:
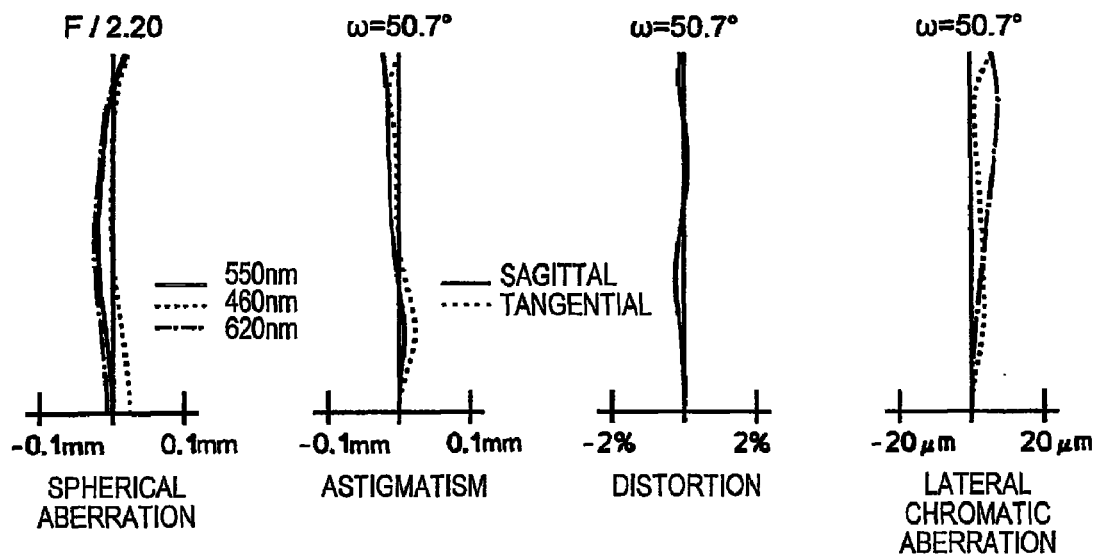
FIG. 16 is a diagram illustrating various aberrations of the projection lens system according to Example 8.

A configuration of the projection lens system according to Example 8 is shown in FIG. 8, and is basically the same as that of the projection lens system according to Example 1. However, the present configuration is different from that of the projection lens system according to Example 1 in that the sixth lens $L_6$ is formed as a biconvex lens.

The top of Table 8 shows various numerical values of a focal length f (mm) of the whole system, a back focal length Bf (mm), an F number Fno., and an angle of view 2ω in Example 8.

Further, the upper part of Table 8 shows radiuses of curvature R (mm) of the lens surfaces of the projection lens system according to Example 8, on-axis surface spacings D (mm), refractive indices $N_d$ of the lenses at the d-line, and Abbe numbers $ν_d$ of the lenses at the d-line.

Further, the middle part of Table 8 shows numerical values of the on-axis surface spacings $D_1$ and $D_2$ when focusing is performed at a predetermined projection distance (1.2 m, focus at infinity).

Furthermore, the lower part of Table 8 shows values of constants K, and $A_3$ to $A_{16}$ corresponding to the respective aspheric surfaces.

TABLE 8

| | f = 9.69, Bf = 29.52, Fno = 2.2, 2ω = 101.4° | | | |
|---|---|---|---|---|
| S | R | D | Nd | νd |
| *1 | −71.427 | 7.00 | 1.49100 | 57.6 |
| *2 | −437.949 | 9.71 | | |
| 3 | 40.765 | 2.20 | 1.51680 | 64.2 |
| 4 | 25.116 | 7.55 | | |
| 5 | 124.983 | 1.80 | 1.84666 | 23.8 |
| 6 | 18.705 | D1 | | |
| 7 | −23.683 | 1.50 | 1.64000 | 60.2 |
| 8 | 301.481 | 5.00 | 1.64769 | 33.8 |
| 9 | −31.075 | D2 | | |
| 10 | 46.271 | 2.95 | 1.84666 | 23.8 |
| 11 | −560.415 | −1.00 | | |
| AP | ∞ | 12.47 | | |
| 13 | 26.404 | 1.20 | 1.83481 | 42.7 |
| 14 | 17.241 | 8.43 | 1.48749 | 70.4 |
| 15 | −29.910 | 0.10 | | |
| 16 | −28.573 | 1.95 | 1.83481 | 42.7 |
| 17 | 25.465 | 7.76 | 1.51680 | 64.2 |
| 18 | −31.723 | 2.27 | | |
| *19 | 3481.750 | 3.20 | 1.51007 | 56.2 |
| *20 | −199.986 | 2.40 | | |
| 21 | −140.435 | 1.50 | 1.84666 | 23.8 |
| 22 | 33.847 | 6.39 | 1.49700 | 81.6 |
| 23 | −63.863 | 0.40 | | |
| 24 | 51.608 | 8.48 | 1.49700 | 81.6 |
| 25 | −34.802 | 12.20 | | |
| 26 | ∞ | 26.30 | 1.51633 | 64.1 |
| 27 | ∞ | | | |

| PROJECTION DISTANCE | D1 | D2 |
|---|---|---|
| 1.2 m | 18.22 | 29.49 |
| inf | 19.84 | 27.87 |

| | Aspheric Coefficient | | | |
|---|---|---|---|---|
| | *1 | *2 | *19 | *20 |
| K | −0.2 | −3.7978309 | 0 | 0 |
| A3 | 1.5982805E−04 | 2.0256023E−04 | 0 | 0 |
| A4 | 1.9261910E−05 | 9.8662700E−06 | 2.3294883E−05 | 3.1617149E−05 |
| A5 | −6.0579522E−07 | −1.0879106E−07 | −4.4428306E−06 | −4.6207882E−06 |
| A6 | 3.2229307E−09 | −4.7824240E−09 | 1.3581295E−07 | 2.9198220E−07 |
| A7 | 1.1245388E−10 | −6.1037785E−11 | 4.2445477E−08 | 4.6340690E−09 |
| A8 | −3.8068485E−13 | 4.4385357E−13 | −3.0676933E−09 | 7.7808553E−10 |
| A9 | −1.9421366E−14 | 3.8630603E−14 | −3.1339415E−11 | −2.2553849E−10 |
| A10 | −1.5528181E−16 | 6.1553576E−16 | 5.9757058E−12 | 1.0192641E−11 |
| A11 | −1.5661690E−19 | 8.2436488E−18 | 3.8872992E−17 | 7.8368581E−16 |
| A12 | 8.3666924E−20 | −4.6605856E−19 | 1.1167434E−15 | 2.6020992E−16 |
| A13 | | | 1.4272859E−16 | 1.3459554E−17 |
| A14 | | | 1.3132091E−17 | −4.9950367E−18 |
| A15 | | | −6.7638973E−19 | 1.8731157E−18 |
| A16 | | | −1.0360846E−19 | −1.6189195E−19 |

AP: Aperture Diaphragm,
*Aspheric Surface

Furthermore, values corresponding to the conditional expressions (1) to (5), (1'), and (4') in Example 8 are shown in Table 9 to be described later, and all the conditional expressions (1) to (5), (1'), and (4') are satisfied.

Further, FIGS. 9 to 16 are aberration diagrams illustrating various diagrams (spherical aberration, astigmatism, distortion, and lateral chromatic aberration) of the projection lens system according to Examples 1 to 8. In these aberration diagrams, ω represents a half angle of view, the aberration diagrams of spherical aberration show aberration curves of rays having wavelengths of 550 nm, 460 nm, and 620 nm, and the aberration diagrams of lateral chromatic aberration show aberrations curves of rays having wavelengths of 460 nm and 620 nm relative to a ray having a wavelength of 550 nm. As shown in FIGS. 9 to 16, in the projection lens systems according to Examples 1 to 8, various aberrations including distortion and lateral chromatic aberration are satisfactorily corrected. Thus, the projection lens systems have half angles of view of 50.7 degrees or more and F numbers in a range of 2.00 to 2.30, and are fast at a wide angle. Further, the projection lens systems have sufficient back focal lengths (29.52 to 30.31). Furthermore, the projection lens systems satisfy the conditional expressions, and exhibit high performance with a compact size.

Further, the projection lens system according to the invention is not limited to the examples mentioned above, and may be modified to various forms. For example, it may be possible to properly modify the radiuses of curvature R of the lenses and the lens spaces (or the lens thicknesses) D.

Furthermore, the projection type display apparatus according to the invention is not limited to the configurations mentioned above, and may be modified for various forms of apparatuses having the projection lens system according to the invention. As the light valve, it may be possible to use a transmissive or reflective liquid crystal display device, or a micro mirror element (for example, a digital micro mirror device manufactured by Texas Instruments Co.) in which a plurality of inclinable micro mirrors are formed on a substantially flat surface. As the illumination optical system, it may be possible to employ an appropriate configuration corresponding to the type of the light valves.

TABLE 9

|  | Cond. (1), (1') f/f$_{2-1}$ | Cond. (2) N$_{2-1}$ | Cond. (3) N$_{2p}$ | Cond. (4), (4') N$_{2n}$ | Cond. (5) \|N$_{1p}$ − N$_{1n}$\| |
|---|---|---|---|---|---|
| Example 1 | 0.192805 | 1.805 | 1.487~1.497 | 1.773~1.806 | 0.017 |
| Example 2 | 0.160484 | 1.762 | 1.487~1.517 | 1.773~1.806 | 0.096 |
| Example 3 | 0.206559 | 1.847 | 1.487~1.517 | 1.835~1.847 | 0.008 |
| Example 4 | 0.220478 | 1.847 | 1.487~1.517 | 1.804~1.847 | 0.017 |
| Example 5 | 0.235023 | 1.847 | 1.487~1.517 | 1.804~1.847 | 0.017 |
| Example 6 | 0.217802 | 1.847 | 1.487~1.517 | 1.804~1.847 | 0.017 |
| Example 7 | 0.189527 | 1.847 | 1.487~1.517 | 1.835~1.847 | 0.008 |
| Example 8 | 0.193413 | 1.847 | 1.487~1.517 | 1.835~1.847 | 0.008 |

Cond.: Conditional Expression(s)

What is claimed is:

1. A projection lens system comprising, in order from a magnification side:
    a first lens group having a negative refractive power; and
    a second lens group having a positive refractive power,
    wherein the projection lens system is substantially telecentric on a reduction side,
    wherein the first lens group includes a first lens formed as an aspheric lens which is disposed closest to the magnification side,
    wherein the second lens group includes a second lens formed as a positive lens, in or near which a stop is provided, disposed closest to the magnification side and an aspheric lens,
    wherein between the stop and the aspheric lens of the second lens group, two or more negative lenses and two or more cemented surfaces are disposed, and
    wherein the following conditional expressions (1) and (2) are satisfied:

$$0.10 < f/f_{2-1} < 0.30 \quad (1), \text{ and}$$

$$N_{2-1} > 1.75 \quad (2),$$

where
    f denotes a focal length of the whole lens system,
    f$_{2-1}$ denotes a focal length of the second lens, and
    N$_{2-1}$ denotes a refractive index of the second lens at the d-line.

2. The projection lens according to claim 1,
    wherein the second lens group includes two or more positive lenses of which the Abbe numbers (v$_d$) are 75 or more.

3. The projection lens system according to claim 1,
    wherein the second lens group includes, in order from the magnification side:
    the second lens formed as the positive lens;
    a cemented lens formed of a negative meniscus lens having a convex surface directed toward the magnification side and a biconvex lens;
    a cemented lens formed of a biconcave lens and a biconvex lens;
    the aspheric lens;
    a cemented lens formed of a biconcave lens and a biconvex lens; and
    a biconvex lens.

4. A projection type display apparatus comprising:
    a light source;
    a light valve;
    an illumination optical unit guiding rays originated from the light source into the light valve; and
    the projection lens system according to claim 1,
    wherein the rays originated from the light source are optically modulated by the light valve, and are projected on a screen by the projection lens system.

5. The projection lens system according to claim 1,
    wherein the first lens group includes, in order from the magnification side:
    the first lens formed as the aspheric lens that is made of plastic;
    two negative meniscus lenses each having a convex surface directed toward the magnification side; and
    a cemented lens formed of a negative lens having a concave surface directed toward the magnification side and a positive lens having a convex surface directed toward the reduction side.

6. The projection lens system according to claim 5,
    wherein focusing is performed by moving the cemented lens of the first lens group in a direction of an optical axis.

7. The projection lens system according to claim 5,
    wherein the cemented lens of the first lens group satisfies the following conditional expression (5):

$$|N_{1p} - N_{1n}| < 0.1 \quad (5),$$

where
    N$_{1p}$ denotes a refractive index of the positive lens constituting the cemented lens at the d-line, and
    N$_{1n}$ denotes a refractive index of the negative lens constituting the cemented lens at the d-line.

8. The projection lens system according to claim 1,
    wherein each lens other than the second lens and the aspheric lens in the second lens group satisfies one of the following conditional expressions (3) and (4):

$$N_{2p} < 1.55 \quad (3), \text{ and}$$

$$N_{2n} > 1.73 \quad (4),$$

where
    N$_{2p}$ denotes a refractive index of a positive lens of said each lens in the second lens group at the d-line, and
    N$_{2n}$ denotes a refractive index of a negative lens of said each lens in the second lens group at the d-line.

9. The projection lens according to claim 8,
wherein the second lens group includes two or more positive lenses of which the Abbe numbers ($v_d$) are 75 or more.

10. The projection lens system according to claim 9,
wherein the first lens group includes, in order from the magnification side:
the first lens formed as the aspheric lens that is made of plastic;
two negative meniscus lenses each having a convex surface directed toward the magnification side; and
a cemented lens formed of a negative lens having a concave surface directed toward the magnification side and a positive lens having a convex surface directed toward the reduction side.

11. The projection lens system according to claim 10,
wherein focusing is performed by moving the cemented lens of the first lens group in a direction of an optical axis.

12. The projection lens system according to claim 11,
wherein the cemented lens of the first lens group satisfies the following conditional expression (5):

$$|N_{1p} - N_{1n}| < 0.1 \qquad (5),$$

where
$N_{1p}$ denotes a refractive index of the positive lens constituting the cemented lens at the d-line, and
$N_{1n}$ denotes a refractive index of the negative lens constituting the cemented lens at the d-line.

13. The projection lens system according to claim 12,
wherein the second lens group includes, in order from the magnification side:
the second lens formed as the positive lens;
a cemented lens formed of a negative meniscus lens having a convex surface directed toward the magnification side and a biconvex lens;
a cemented lens formed of a biconcave lens and a biconvex lens;
the aspheric lens;
a cemented lens formed of a biconcave lens and a biconvex lens; and
a biconvex lens.

14. A projection type display apparatus comprising:
a light source;
a light valve;
an illumination optical unit guiding rays originated from the light source into the light valve; and
the projection lens system according to claim 13,
wherein the rays originated from the light source are optically modulated by the light valve, and are projected on a screen by the projection lens system.

* * * * *